United States Patent
Konze et al.

(10) Patent No.: US 8,354,484 B2
(45) Date of Patent: *Jan. 15, 2013

(54) HIGH TEMPERATURE SOLUTION POLYMERIZATION PROCESS

(75) Inventors: Wayde V. Konze, Midland, MI (US); Daniel D. VanderLende, Sugar Land, TX (US)

(73) Assignee: Dow Global Technologies, LLC, Midland, MI (US)

( * ) Notice: Subject to any disclaimer, the term of this patent is extended or adjusted under 35 U.S.C. 154(b) by 602 days.

This patent is subject to a terminal disclaimer.

(21) Appl. No.: 12/302,050

(22) PCT Filed: Apr. 24, 2007

(86) PCT No.: PCT/US2007/009845
§ 371 (c)(1),
(2), (4) Date: Mar. 23, 2010

(87) PCT Pub. No.: WO2007/136497
PCT Pub. Date: Nov. 29, 2007

(65) Prior Publication Data
US 2011/0313119 A1    Dec. 22, 2011

Related U.S. Application Data

(60) Provisional application No. 60/801,182, filed on May 17, 2006.

(51) Int. Cl.
*C08F 4/64* (2006.01)
*C08F 4/76* (2006.01)
*C08F 4/52* (2006.01)

(52) U.S. Cl. ........ 526/161; 526/172; 526/160; 526/170; 526/134; 526/348; 526/352

(58) Field of Classification Search .................. 526/348, 526/172, 161, 901, 160, 170
See application file for complete search history.

(56) References Cited

U.S. PATENT DOCUMENTS

| | | | | |
|---|---|---|---|---|
| 5,624,878 A | * | 4/1997 | Devore et al. | 502/152 |
| 6,506,857 B2 | * | 1/2003 | Rix | 526/107 |
| 6,559,253 B2 | * | 5/2003 | Crowther et al. | 526/160 |
| 6,897,276 B2 | * | 5/2005 | Boussie et al. | 526/172 |
| 7,737,220 B2 | * | 6/2010 | Swabey et al. | 525/192 |

* cited by examiner

*Primary Examiner* — Rip A. Lee

(57) ABSTRACT

A catalyst composition comprising one or more metal complexes of a multifunctional Lewis base ligand comprising a bulky, planar, aromatic- or substituted aromatic-group and polymerization processes employing the same, especially continuous, solution polymerization of one or more α-olefins at high catalyst efficiencies are disclosed.

21 Claims, No Drawings

HIGH TEMPERATURE SOLUTION POLYMERIZATION PROCESS

CROSS REFERENCE STATEMENT

This application claims the benefit of U.S. Provisional Application 60/801,182, filed May 17, 2006. This application is a National Stage entry under 35 USC §371 of PCT/US2007/009845, filed Apr. 24, 2007.

BACKGROUND OF THE INVENTION

Higher temperature solution processes for olefin polymerization are highly desirable due to the increased throughput, decreased energy necessary for devolatization and decreased fouling that these higher temperatures afford. Although Ziegler-Natta catalyst systems can be run at high temperatures commercially, these catalysts suffer from poor efficiency and poor comonomer incorporation at elevated temperatures. In addition, polymers produced from Ziegler-Natta catalysts at elevated temperatures have broadened molecular weight distributions, thereby limiting their suitability for use in many applications. Conventional Ziegler-Natta catalysts are typically composed of many types of catalytic species, each having different metal oxidation states and different coordination environments with ligands. Examples of such heterogeneous systems are known and include metal halides activated by an organometallic co-catalyst, such as titanium chloride supported on magnesium chloride, activated with trialkyl aluminum. Because these systems contain more than one catalytic species, they possess polymerization sites with different activities and varying abilities to incorporate comonomer into a polymer chain. The consequence of such multi-site chemistry is a product with poor control of the polymer chain architecture, leading to a heterogeneous composition. Moreover, differences in the individual catalyst site produce polymers of high molecular weight at some sites and low molecular weight at others, resulting in a polymer with a broad molecular weight distribution. Due to these reasons, mechanical and other properties of the polymers are often less than desired.

More recently, catalyst compositions based on well defined metal complexes, especially transition metal complexes such as constrained geometry catalysts (CGCs), metallocenes and post-metallocenes have been shown to give products having better comonomer incorporation and narrow molecular weight distribution. However, these catalysts often have poor high temperature stability and suffer from poor efficiencies at elevated polymerization temperatures. Additionally, the molecular weight of the polymers formed from these catalysts often decreases dramatically with increasing temperature, especially for polymers containing significant amounts of comonomer (lower density). That is, the ability of most olefin polymerization catalysts to incorporate higher α-olefins in an ethylene/α-olefin copolymer decreases with increasing polymerization temperature. In other words, the reactivity ratio $r_1$ generally increases with increasing polymerization temperature.

Reactivity ratios of catalysts may be obtained by known methods, for example, the technique described in "Linear Method for Determining Monomer Reactivity Ratios in Copolymerization", M. Fineman and S. D. Ross, *J. Polymer Science*, 5, 259 (1950) or "Copolymerization", F. R. Mayo and C. Walling, *Chem. Rev.*, 46, 191 (1950). One widely used copolymerization model is based on the following equations:

where $M_i$ refers to a monomer molecule which is arbitrarily designated as "i" where i=1, 2; and $M_2^*$ refers to a growing polymer chain to which monomer i has most recently attached.

The $k_{ij}$ values are the rate constants for the indicated reactions. For example, in ethylene/propylene copolymerization, $k_{11}$ represents the rate at which an ethylene unit inserts into a growing polymer chain in which the previously inserted monomer unit was also ethylene. The reactivity ratios follow as: $r_1=k_{11}/k_{12}$ and $r_2=k_{22}/k_{21}$ wherein $k_{11}$, $k_{12}$, $k_{22}$ and $k_{21}$ are the rate constants for ethylene (1) or propylene (2) addition to a catalyst site where the last polymerized monomer is an ethylene ($k_{1X}$) or propylene ($k_{2X}$).

Thus, an olefin polymerization process is sought in which polymers containing various amounts of comonomer content can be produced with high catalyst efficiency and high monomer conversions and very high reactor temperatures without suffering from poor overall molecular weight in the resulting polymers. In addition, low molecular weight distribution ($M_W/M_N<3.0$) is desired in such a process. Ideally, such a process could be carried out at elevated temperatures and still produce polymers having high molecular weight and relatively high comonomer incorporation. It is known in the art that polymer molecular weight is readily controlled by use of chain transfer agents such as hydrogen or organometal compounds. Thus, a high temperature polymerization process that is capable of high levels of comonomer incorporation and produces high molecular weight polymers having low molecular weight distributions is desired in the art. Such a process additionally including a chain transfer agent to produce lower molecular weight polymers or the incorporation of long chain branching is further desired.

In US 2005/0215737 A1, a continuous, solution, olefin polymerization process is disclosed for preparing ethylene-butene and ethylene-propylene interpolymers at high ethylene conversions. Disadvantageously, the resulting polymers were primarily plastomers having relatively low molecular weights. No chain transfer agent was employed, indicating that molecular weight of the resulting polymer was relatively low and catalyst efficiencies were also low, especially at higher reaction temperatures.

In WO 99/45041, another continuous solution olefin polymerization process is disclosed using bridged hafnocene complexes with noncoordinating anionic cocatalysts. Although the resulting polymers contained significant amounts of comonomer, catalyst efficiencies were relatively low and polymer molecular weights, even in the absence of chain transfer agent were less than desirable.

In WO 03/102042, a high temperature solution olefin polymerization process is disclosed using indenoindolyl transition metal complexes to prepare polyolefins at temperatures at greater than about 130° C. In one example, the copolymerization of ethylene and 1-hexene was carried out at 180° C. resulting in formation of a polymer having poor comonomer incorporation (density=0.937 g/cm³) at relatively low catalyst efficiencies.

In U.S. Pat. No. 6,827,976, there are disclosed certain highly active polymerization catalysts comprising Group 3-6 or Lanthanide metal complexes, preferably Group 4 metal complexes, of bridged bi-aromatic ligands containing a divalent Lewis base chelating group. The metal complexes were employed in combination with activating cocatalysts in the polymerization of olefins including mixtures of ethylene and α-olefins, including 1-octene, to obtain polymers containing high comonomer incorporation rates at elevated temperatures.

US2004/0010103 disclosed certain aromatic polyether derivatives of transition metals and their use as catalysts for olefin polymerizations. Typical olefin polymerizations using prior art compositions are disclosed in US2003229188, WO00/24793, Akimoto, et al., *J. Mol. Cat. A: Chem.* 156(1-2), 133-141 (2000), among other references.

We have now discovered that certain metal complexes may be employed in a solution polymerization process to prepare relatively high molecular weight ethylene interpolymers containing relatively large quantities of comonomer incorporated therein at unusually high temperatures and high olefin conversions if certain process conditions are observed. Accordingly, there is now provided a process for the preparation of olefin polymer products, especially high molecular weight polyolefins, at very high catalyst efficiency. In addition, we have discovered that these catalyst compositions retain their high catalyst activity using relatively low molar ratios of conventional alumoxane cocatalysts. The use of reduced quantities of alumoxane cocatalysts (up to 90 percent or more less than conventionally employed) allows for the preparation of polymer products having reduced metal content and consequently increased clarity, improved dielectric and other physical properties. In addition, the use of reduced quantities of alumoxane cocatalysts results in reduction in polymer production costs.

SUMMARY OF THE INVENTION

According to the present invention there is now provided a process for polymerization of ethylene and optionally one or more $C_{3-20}$ α-olefins under solution polymerization conditions at high temperatures with a catalyst composition comprising a transition metal complex and affording high molecular weight, high comonomer containing copolymers with narrow molecular weight distribution.

Despite the use of extremely high, solution polymerization temperatures, the resulting interpolymers possess relatively high molecular weights (with correspondingly low melt indices) and high levels of comonomer incorporation (low densities). We have discovered that the foregoing metal complexes can be activated with relatively low molar ratios (100 or less) of neutral, Lewis acid activators, such as alumoxanes, and still are capable of use under these high temperature, high conversion conditions with very high catalyst efficiencies.

The present invention results in a high temperature solution polymerization process for preparing interpolymers of ethylene and one or more $C_{3-20}$ α-olefins, and is particularly advantageous for use under continuous solution polymerization conditions wherein a reaction mixture comprising metal complex, activating cocatalyst, optionally a chain transfer agent, and at least one $C_{2-20}$ α-olefin is continuously added to a reactor operating under solution polymerization conditions, and polymer product is continuously or semi-continuously removed therefrom. In one embodiment the invention is used to prepare copolymers of ethylene and at least one $C_{3-20}$ α-olefin, preferably ethylene and at least one $C_{6-20}$ α-olefin.

In another embodiment, this invention can be used to prepare $C_{3-20}$ α-olefin homopolymers, or copolymers consisting essentially of two or more $C_{3-20}$ α-olefins. In addition, the process may employ the use of catalyst compositions comprising more than one metal complex or compound and/or using or employing multiple reactors.

The key to obtaining the foregoing benefits is the use of solution polymerization conditions, temperatures from 170° C. or 185° C. or even 190° C. and up to 230° C., or 240° C. or even 250° C., high monomer conversions, which in the case of ethylene containing polymerizations, are at least 85 percent, and low cocatalyst concentrations, preferably molar concentrations of alumoxanes that are less than 200:1, preferably less than 100:1, more preferably less than 50:1 based on transition metal content of the catalyst.

DETAILED DESCRIPTION OF THE INVENTION

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indiCated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge. The term "amorphous" refers to a polymer lacking a crystalline melting point as determined by differential scanning calorimetry (DSC) or equivalent technique.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms and no hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylselenogroup is within the scope of the term heteroalkyl. Examples of suitable heteroalkyl groups include cyanomethyl-, benzoyl-methyl-, (2-pyridyl)methyl-, and trifluoromethyl-groups.

As used herein the term "aromatic" refers to a polyatomic, cyclic, conjugated ring system containing $(4\delta+2)$ π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

Embodiments of the invention provide a new solution process for making olefin polymers with a homogeneous transition metal complex containing catalyst composition at high temperature, high catalyst efficiency and high monomer conversion wherein the produced polymers are of sufficiently high molecular weight so as to still allow for the presence of significant amounts of a chain transfer agent such as hydrogen to control molecular weight of the polymers. Highly desirably, the produced polymers are of high molecular weight ($I_2<2.0$) and can be of variable density (due to varying amounts of comonomer incorporation). Particularly of interest is the ability to produce high molecular weight, high comonomer-containing ethylene interpolymers under these high temperature, high conversion conditions with very high catalyst efficiency. These polymers desirably have narrow molecular weight distributions ($M_w/M_n<3.0$) and can give high levels of long chain branches, preferably >3.0 long chain branches per 10,000 carbons, especially when zirconium containing metal complexes are employed. Such polymers are suitably employed where improved extrusion performance is desired, such as in wire and cable insulating resins.

The unique process conditions employed according to the invention can be summarized in an equation which takes into account the reaction temperature and ethylene conversion along with the resulting polymer properties of density, melt index and molecular weight that are produced at these temperatures and conversions. These conditions produce a polymer that results in a value for the polymerization index, Ψ, that is greater than or equal to zero according to the following equation:

$$\Psi = \beta_0 + \beta_1 T + \beta_2 X + \beta_3 E + \beta_4 \rho + \beta_5 I_2$$

where, T is the polymerization temperature in degrees Celsius, X is the ethylene conversion in the reactor in mol percent, E is the catalyst efficiency in g polymer produced per μg of metal in the metal complex fed to the reactor per unit time, ρ is the resulting polymer density in units of g/ml, $I_2$ is the melt index of the polymer in units of dg/minute, and the equation constants, $\beta_0$-$\beta_5$, are unit-less numbers having the values defined in the following table:

| Equation Constant | Value |
| --- | --- |
| $\beta_0$ | −13796.073 |
| $\beta_1$ | 111.445393 |
| $\beta_2$ | 137.437524 |
| $\beta_3$ | 62.5876298 |
| $\beta_4$ | −18931.8878 |
| $\beta_5$ | −108.320017 |

Preferred polymerization conditions are steady state, continuous, solution polymerization conditions in which the foregoing polymerization index is at least 0.05, more preferably at least 0.1. Although units are associated with the various parameters used in the calculation of the polymerization index, only the unit-less value of the resulting sum is employed as the index.

The term "polymer" as used herein refers to a macromolecular compound prepared by polymerizing one or more monomers. A polymer refers to homopolymers, copolymers, terpolymers, interpolymers, and so on, containing 5 or more repeat units. Compounds containing less than 5 repeating units are referred to as oligomers. The term "interpolymer" is used herein interchangeably with the term copolymer to refer to polymers incorporating in polymerized form at least two copolymerizable monomers, or incorporating long chain branching as a result of chain termination/olefin formation reactions in situ, and reincorporation of the in situ formed olefin. Accordingly, copolymers may result from the polymerization of a single monomer, under the correct operating conditions. The least prevalent monomer in the resulting copolymer or interpolymer is generally referred to by the term "comonomer". The chain length of the resulting long chain branches referred to above, is consequently longer than the carbon length resulting from polymerization of any deliberately added comonomer, and in particular, longer than 6 carbons. The presence of long chain branching may also be determined by the increased shear sensitivity of the polymer, as disclosed in EP-A-608369, and elsewhere, and determined by Melt Index Ratio (MIR), a ratio of polymer melt viscosities measured under differing loads, especially $I_{21}/I_2$. Preferred polymers according to the invention have MIR values from 30 to 80.

The process described herein may be employed to prepare any olefin polymer, especially ethylene homopolymers, copolymers of ethylene with one or more $C_{3-20}$ olefins, copolymers of ethylene with one or more $C_{6-20}$ olefins, and ethylene/propylene, ethylene/1-butene, ethylene/1-hexene, ethylene/4-methyl-1-pentene, ethylene/styrene, ethylene/propylene/styrene, and ethylene/1-octene copolymers, isotactic polypropylene/1-butene, isotactic polypropylene/1-hexene, isotactic polypropylene/1-octene, terpolymers of ethylene, propylene and a non-conjugated diene, for example, EPDM terpolymers, as well as homopolymers of propylene, butylene, or styrene.

Polymerization conditions generally refer to temperature, pressure, monomer content (including comonomer concentration), catalyst concentration, cocatalyst concentration, monomer conversion, or other conditions that influence the properties of the resulting polymer. By operation according to the prescribed polymerization conditions of the invention high molecular weight polymers may be prepared having relatively high comonomer incorporation with high catalyst activities. In particular, activities (based on weight of polymer to weight of transition metal) greater than 0.5 g/µg, preferably greater than 0.55 g/µg, and even greater than 0.6 g/µg are possible. Polymer weight-average molecular weight ($M_w$) is measured by gel permeation chromatography, one technique of which as described in U.S. Pat. No. 5,272,236. Alternatively, melt index, $I_2$, $I_{10}$ or $I_{21}$, measured for example according to ASTM D-1238 may be employed as an indication of molecular weight. Generally, melt index is inversely related to the molecular weight of the polymer. The higher the molecular weight, the lower the melt index, although the relationship is not necessarily linear.

One embodiment of this invention entails a process which comprises contacting one or more olefins in a high temperature solution polymerization process. The present invented process is particularly advantageous for use under polymerization conditions wherein a reaction mixture comprising metal complex, activating cocatalyst, ethylene, and optionally at least one $C_{3-20}$ α-olefin comonomer is continuously added to a reactor operating under solution polymerization conditions, optionally in the additional presence of a chain transfer agent, and polymerized product is continuously or semi-continuously removed therefrom. This process can consist of:

1) Polymerizing ethylene and optionally one or more $C_{3-20}$ α-olefins using a transition metal complex and an activating cocatalyst, especially a neutral Lewis acid, more preferably an alumoxane, under continuous, solution polymerization conditions at a temperature from 185 to 250° C., preferably from 200 to 250° C., under high ethylene conversion conditions (>85 percent) which results in a polymer with a density between 0.885 and 0.950 g/cm³ and a low melt index ($I_2$<2.0) with a narrow molecular weight distribution (Mw/Mn<3.0) and a catalyst efficiency of greater than 0.5 $g_{polymer}$/µ$g_{metal}$.

When a chain transfer agent is utilized, a sufficient quantity is used so that a substantial decrease in molecular weight (>30 percent) occurs compared to a comparative polymerization without the use of chain transfer agent. When the chain transfer agent is hydrogen, at least 0.015 mol percent (based on ethylene) is used, and a maximum of about 2 mol percent is used. In addition, this process can be used to produce polymers which contain significant amounts of long chain branches.

2) Polymerizing ethylene and one or more $C_{3-20}$ α-olefins, preferably one or more $C_{6-20}$ α-olefins, using a transition metal complex and an activating cocatalyst, especially a neutral Lewis acid, more preferably an alumoxane, under continuous, solution polymerization conditions in the presence of a chain transfer agent at a temperature from 170 to 250° C. under high ethylene conversion conditions (>85 percent) which results in a polymer with a density between 0.865 and 0.885 g/cm³ and a low melt index ($I_2$<2.0) with a narrow molecular weight distribution (Mw/Mn<3.0) and a catalyst efficiency of greater than 0.5 $g_{polymer}$/µ$g_{metal}$.

A sufficient quantity of chain transfer agent is preferably used so that a substantial decrease in molecular weight (>30 percent) occurs compared to a comparative polymerization without the use of chain transfer agent. When the chain transfer agent is hydrogen, at least 0.015 mol percent (based on monomer content) is used, and a maximum of about 2 mol percetit is used. In addition, this process can be used to produce polymers which contain significant amounts of long chain branches, preferably through use of catalysts comprising zirconium containing metal complexes.

3) Polymerizing one or more $C_{3-20}$ α-olefins using a transition metal complex and an activating cocatalyst, especially a neutral Lewis acid, more preferably an alumoxane, under continuous, solution polymerization conditions in the presence of a chain transfer agent at a temperature from 170 to 250° C. which results in a polymer with a low melt index ($I_2$<2.0) with a narrow molecular weight distribution (Mw/Mn<3.0) and a catalyst efficiency of greater than 0.5 $g_{polymer}$/µ$g_{metal}$.

Polymerizing one or more $C_{3-20}$ α-olefins using a homogeneous transition metal catalyst and a catalyst activator under continuous, solution polymerization conditions at a temperature from 170 to 250° C. which results in a polymer with a low melt index (<2) with a narrow molecular weight distribution (<3) and a catalyst efficiency of greater than 0.5 million $g_{polymer}$/$g_{metal}$ and which utilizes a chain transfer agent to control molecular weight.

A sufficient quantity of chain transfer agent is preferably used so that a substantial decrease in molecular weight (>30 percent) occurs compared to a comparative polymerization without the use of chain transfer agent. When the chain transfer agent is hydrogen, at least 0.01 mol percent (based on total α-olefin content) is used, and a maximum of about 2 mol percent is used. In addition, this process can be used to produce polymers which contain significant amounts of long chain branches, preferably using catalysts comprising zirconium containing metal complexes.

Suitable alumoxanes include polymeric or oligomeric alumoxanes, especially methalumoxane (MAO) or isobutylalumoxane (IBA) as well as Lewis acid modified alumoxanes, such as trihydrocarbylaluminum-, halogenated tri(hydrocarbyl)aluminum- or halogenated tri(hydrocarbyl)boron-modified alumoxanes, having from 1 to 10 carbons in each hydrocarbyl or halogenated hydrocarbyl group. Examples include, tri(isobutyl)aluminum modified methalumoxane tri(n-octyl) aluminum modified methalumoxane, and tris(pentafluorophenyl)borane modified alumoxanes. Such activating cocatalysts are previously disclosed in U.S. Pat. Nos. 6,214,760, 6,160,146, 6,140,521, and 6,696,379, and elsewhere.

Additional suitable neutral Lewis acid activating cocatalysts include $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 30 carbons in each hydrocarbyl or halogenated hydrocarbyl group. In addition, di(hydrocarbyl)zinc, di(hydrocarbyl)aluminum halides, di(hydrocarbyl)aluminum alkoxides and di(hydrocarbyl)-aluminum amides may be employed.

The Lewis acid activator is preferably utilized in molar ratios cocatalyst:catalyst from 1-200, preferably from 1-150 and most preferably from 1-100. Alumoxane and Lewis acid modified alumoxane cocatalysts are preferably utilized in molar ratios Al:catalyst from 20-200, preferably from 30-150 and most preferably from 40-100. Preferred cocatalysts are methalumoxane, tri(1-butyl)laluminum modified methalumoxane and tri(n-octyl)aluminum modified methalumoxane.

Because of the ability to be activated at relatively low levels of alumoxane or Lewis acid modified alumoxane cocatalysts, the present metal complexes are also preferred for use in other polymerization processes, such as gas phase, high pressure, or slurry polyolefin process. In these processes, the metal complexes may be supported on conventional supports and activated under many different conditions that are not available to complexes which require non-coordinating anionic activators or large amounts of alumoxanes to achieve suitable activity.

Multiple reactor polymerization processes are suitably employed in the present invention. Examples include such systems as are disclosed in U.S. Pat. No. 3,914,342, among others. The multiple reactors can be operated in series or in parallel, with at least one catalyst composition according to the present invention employed in at least one of the reactors. One or both reactors may also contain at least two catalysts which have different comonomer incorporation capability and/or different molecular weight capability. In one embodiment, a relatively high molecular weight product ($M_w$ from 100,000 to over 1,000,000, more preferably 200,000 to 500,000) is formed in the second reactor a product of a relatively low molecular weight ($M_w$ 2,000 to 300,000) is formed. Both of these reactor products can have similar or different densities. The final product is a mixture of the two reactor effluents which are combined prior to devolatilization to result in a uniform mixing of the two polymer products. In another embodiment, the molecular weight of the products from both reactors is nearly the same but the densities vary to the extent that one of the reactors produces a polymer with density in the range of 0.865-0.895, while the other reactor produces polymer with density in the range of 0.885-0.950. Such a dual reactor/dual catalyst process allows for the preparation of products with tailored properties. In one embodiment, the reactors are connected in series, that is, the effluent from the first reactor is charged to the second reactor and fresh monomer, solvent and hydrogen is optionally added to the second reactor. Reactor conditions are adjusted such that the weight ratio of polymer produced in the first reactor to that produced in the second reactor is ideally in the range from 20:80 to 80:20. In addition, the temperature of either the first reactor or the second reactor or both can be at the high temperature and high catalyst efficiency conditions that are herein disclosed, preferably the second reactor is run at the higher temperature and efficiency.

In one embodiment, one of the reactors in the polymerization process, including the first of two reactors operating in series, contains a heterogeneous Ziegler-Natta catalyst or chrome catalyst known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natta catalysts and their preparation include, but are not limited to, those disclosed in U.S. Pat. Nos. 4,612,300, 4,330,646, and 5,869,575. A unique advantage of the present invention is the ability of the present catalysts to operate despite the presence of significant quantities of a Ziegler/Natta or chrome based heterogeneous catalyst composition or the byproducts resulting from the use thereof.

Single reactor, multiple catalyst processes are also useful in the present invention. In one embodiment, two or more catalysts are introduced into a single reactor at the high temperature conditions that are herein disclosed, wherein each catalyst inherently produces different polyolefin copolymers.

In one embodiment, a relatively high molecular weight product ($M_w$ from 100,000 to over 1,000,000, more preferably 200,000 to 500,000) is formed from one catalyst while a product of a relatively low molecular weight ($M_w$ 2,000 to 300,000) is formed from the other catalyst. Both of these catalyst compositions can have similar or different comonomer incorporation ability. The resulting polymer will have properties dependant on the ratio of the two catalysts that are employed in the single reactor. Suitable combinations of polymer molecular weight, comonomer incorporation ability, processes and ratios of catalysts, for such products are disclosed in U.S. Pat. No. 6,924,342. Due to the unique compatibility of the present catalyst compositions with other olefin polymerization catalysts, including Ziegler/Natta catalysts, the second catalyst composition may comprise a metal complex as herein disclosed, a metallocene or other π-bonded ligand group containing metal complex (including constrained geometry metal complexes), or a polyvalent heteroatom ligand group containing metal complex, especially polyvalent pyridylamine or imidizolylamine based complexes.

Metal Complexes

Suitable metal complexes for use according to the present invention correspond to the formula:

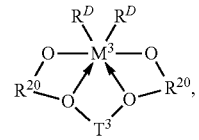

where:

$R^{20}$ is an aliphatic, aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium, most preferably zirconium;

$R^D$ independently each occurrence is a monovalent ligand group or two $R^D$ groups together are a divalent hydrocarbylene or hydrocarbadiyl group; and bonds and electron donative interactions are represented by lines and arrows respectively.

Preferably, such complexes correspond to the formula:

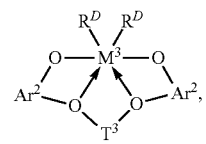

wherein:

$T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl-, aryl-, alkoxy- or amino-substituted arylene group of from 6 to 20 atoms not counting hydrogen and not counting the substituents;

$M^3$ is a Group 4 metal, preferably hafnium or zirconium, most preferably zirconium;

$R^D$ independently each occurrence is a monovalent ligand group or two $R^D$ groups together are a divalent hydrocarbylene or hydrocarbadiyl group; and electron donative interactions are represented by arrows.

More preferred examples of metal complexes of foregoing formula include the following compounds:

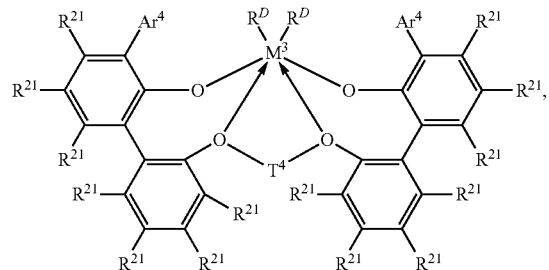

where $M^3$ is Hf or Zr, preferably Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl groups.

Especially preferred metal complexes are compounds of the formula:

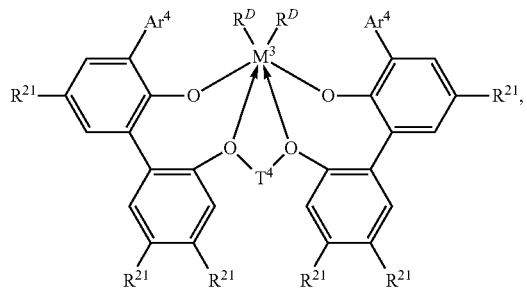

where $M^3$ is Hf or Zr, especially Zr;

$Ar^4$ is 3,5-di(isopropyl)phenyl, 3,5-di(isobutyl)phenyl, dibenzo-1H-pyrrole-1-yl, or anthracen-5-yl, $R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or butan-1,4-diyl, cyclohexanediyl or cyclohexanedialkylenyl; and $R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl groups.

Most highly preferred metal complexes according to the invention correspond to the formulas:

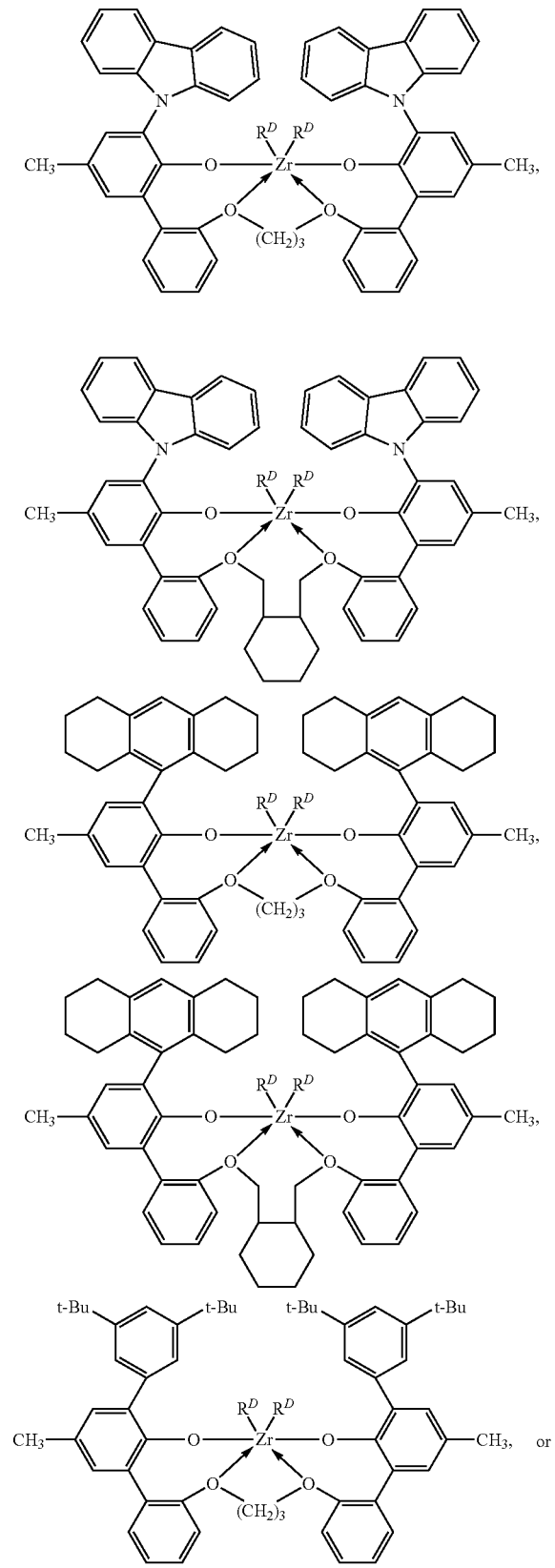

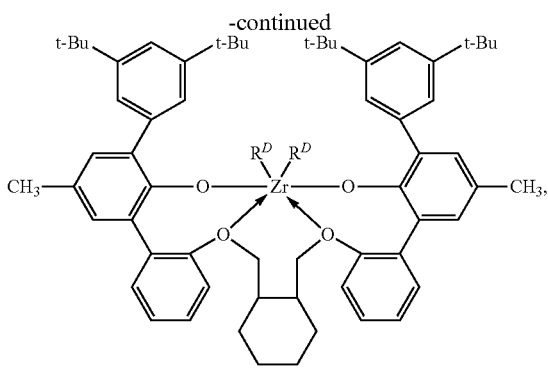

wherein
R$^D$ independently each occurrence is chloro, methyl or benzyl, and
electron donative interactions between the ether groups and zirconium are represented by arrows.

Specific examples of the foregoing metal complexes are the following compounds:

A) bis((2-oxoyl-3-(1,2,3,4,6,7,8,9-octahydroanthracen-5-yl)-5-(methyl)phenyl)-2-phenoxy)propane-1,2-diylzirconium (IV) dimethyl,
bis((2-oxoyl-3-(1,2,3,4,6,7,8,9-octahydroanthracen-5-yl)-5-(methyl)phenyl)-2-phenoxy)propane-1,2-diylzirconium (IV) dichloride,
bis((2-oxoyl-3-(dibenzo-1H-pyrrole-1-yl)-5-(methyl)phenyl)-2-phenoxy)propane-1,2-diylzirconium (IV) dimethyl,
bis((2-oxoyl-3-(dibenzo-1H-pyrrole-1-yl)-5-(methyl)phenyl)-2-phenoxy)propane-1,2-diylzirconium (IV) dichloride,
bis((2-oxoyl-3-(1,1-dimethylethyl)phen-1-yl)-5-(methyl)phenyl)-2-phenoxy)propane-1,2-diylzirconium (IV) dimethyl,
bis((2-oxoyl-3-(1,1-dimethylethyl)phen-1-yl)-5-(methyl)phenyl)-2-phenoxy)propane-1,2-diylzirconium (IV) dichloride,
bis((2-oxoyl-3-(1,2,3,4,6,7,8,9-octahydroanthracen-5-yl)-5-(methyl)phenyl)-2-phenoxy)-trans-cyclohexane-1,2-dimethylenyl-1,2-diylzirconium (IV) dimethyl,
bis((2-oxoyl-3-(1,2,3,4,6,7,8,9-octahydroanthracen-5-yl)-5-(methyl)phenyl)-2-phenoxy)-trans-cyclohexane-1,2-dimethylenyl-1,2-diylzirconium (IV) dichloride,
bis((2-oxoyl-3-(dibenzo-1H-pyrrole-1-yl)-5-(methyl)phenyl)-2-phenoxy)-trans-cyclohexane-1,2-dimethylenyl-1,2-diyl zirconium (IV) dimethyl,
bis((2-oxoyl-3-(dibenzo-1H-pyrrole-1-yl)-5-(methyl)phenyl)-2-phenoxy)-trans-cyclohexane-1,2-dimethylenyl-1,2-diylzirconium (IV) dichloride,
bis((2-oxoyl-3-(1,1-dimethylethyl)phen-1-yl)-5-(methyl)phenyl)-2-phenoxy)-trans-cyclohexane-1,2-dimethylenyl-1,2-diylzirconium (IV) dimethyl,
bis((2-oxoyl-3-(1,1-dimethylethyl)phen-1-yl)-5-(methyl)phenyl)-2-phenoxy)-trans-cyclohexane-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-2-phenoxy)-cis-cyclohexane-1,3-diylzirconium (IV) dimethyl,
bis((2-oxoyl-3-(1,2,3,4,6,7,8,9-octahydroanthracen-5-yl)-5-(methyl)phenyl)-2-phenoxy)-cis-cyclohexane-1,3-diylzirconium (IV) dichloride,
bis((2-oxoyl-3-(dibenzo-1H-pyrrole-1-yl)-5-(methyl)phenyl)-2-phenoxy)-cis-cyclohexane-1,3-diylzirconium (N) dimethyl,
bis((2-oxoyl-3-(dibenzo-1H-pyrrole-1-yl)-5-(methyl)phenyl)-2-phenoxy)-cis-cyclohexane-1,3-diylzirconium (IV) dichloride,
bis((2-oxoyl-3-(1,1-dimethylethyl)phen-1-yl)-5-(methyl)phenyl)-2-phenoxy)-cis-cyclohexane-1,3-diylzirconium (IV) dimethyl,
bis((2-oxoyl-3-(1,1-dimethylethyl)phen-1-yl)-5-(methyl)phenyl)-2-phenoxy)-cis-cyclohexane-1,3-diylzirconium (IV) dichloride,
bis((2-oxoyl-3-(1,2,3,4,6,7,8,9-octahydroanthracen-5-yl)-5-(methyl)phenyl)-2-phenoxy)-cis-cyclohexene-1,2-dimethylenyl-1,2-diylzirconium (IV) dimethyl,
bis((2-oxoyl-3-(1,2,3,4,6,7,8,9-octahydroanthracen-5-yl)-5-(methyl)phenyl)-2-phenoxy)-cis-cyclohexene-1,2-dimethylenyl-1,2-diylzirconium (IV) dichloride,
bis((2-oxoyl-3-(dibenzo-1H-pyrrole-1-yl)-5-(methyl)phenyl)-2-phenoxy)-cis-cyclohexene-1,2-dimethylenyl-1,2-diylzirconium (IV) dimethyl,
bis((2-oxoyl-3-(dibenzo-1H-pyrrole-1-yl)-5-(methyl)phenyl)-2-phenoxy)-cis-cyclohexene-1,2-dimethylenyl-1,2-diylzirconium (IV) dichloride,
bis((2-oxoyl-3-(1,1-dimethylethyl)phen-1-yl)-5-(methyl)phenyl)-2-phenoxy)-cis-cyclohexene-1,2-dimethylenyl-1,2-diylzirconium (IV) dimethyl,
bis((2-oxoyl-3-(1,1-dimethylethyl)phen-1-yl)-5-(methyl)phenyl)-2-phenoxy)-cis-cyclohexene-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-2-phenoxy)butane-1,4-diylzirconium (IV) dimethyl,
bis((2-oxoyl-3-(1,2,3,4,6,7,8,9-octahydroanthracen-5-yl)-5-(methyl)phenyl)-2-phenoxy)butane-1,4-diylzirconium (IV) dichloride,
bis((2-oxoyl-3-(dibenzo-1H-pyrrole-1-yl)-5-(methyl)phenyl)-2-phenoxy)butane-1,4-diylzirconium (IV) dimethyl,
bis((2-oxoyl-3-(dibenzo-1H-pyrrole-1-yl)-5-(methyl)phenyl)-2-phenoxy)butane-1,4-diylzirconium (IV) dichloride,
bis((2-oxoyl-3-(1,1-dimethylethyl)phen-1-yl)-5-(methyl)phenyl)-2-phenoxy)butane-1,4-diylzirconium (IV) dimethyl,
bis((2-oxoyl-3-(1,1-dimethylethyl)phen-1-yl)-5-(methyl)phenyl)-2-phenoxy)butane-1,4-diylzirconium (IV) dichloride, B) bis((2-oxoyl-3-(1,2,3,4,6,7,8,9-octahydroanthracen-5-yl)-5-(methyl)phenyl)-(4-methyl-2-phenoxy))propane-1,2-diylzirconium (IV) dimethyl,
bis((2-oxoyl-3-(1,2,3,4,6,7,8,9-octahydroanthracen-5-yl)-5-(methyl)phenyl)-(4-methyl-2-phenoxy))propane-1,2-diylzirconium (IV) dichloride,
bis((2-oxoyl-3-(dibenzo-1H-pyrrole-1-yl)-5-(methyl)phenyl)-(4-methyl-2-phenoxy))propane-1,2-diylzirconium (IV) dimethyl,
bis((2-oxoyl-3-(dibenzo-1H-pyrrole-1-yl)-5-(methyl)phenyl)-(4-methyl-2-phenoxy))propane-1,2-diylzirconium (IV) dichloride,
bis((2-oxoyl-3-(1,1-dimethylethyl)phen-1-yl)-5-(methyl)phenyl)-(4-methyl-2-phenoxy))propane-1,2-diyl zirconium (IV) dimethyl,
bis((2-oxoyl-3-(1,1-dimethylethyl)phen-1-yl)-5-(methyl)phenyl)-(4-methyl-2-phenoxy))propane-1,2-diylzirconium (IV) dichloride,
bis((2-oxoyl-3-(1,2,3,4,6,7,8,9-octahydroanthracen-5-yl)-5-(methyl)phenyl)-(4-methyl-2-phenoxy))-trans-cyclohexane-1,2-dimethylenyl-1,2-diylzirconium (IV) dimethyl, bis((2-oxoyl-3-(1,2,3,4,6,7,8,9-octahydroanthracen-5-yl)-5-(methyl)phenyl)-(4-methyl-2-phenoxy))-trans-cyclohexane-1,2-dimethylenyl-1,2-diylzirconium (IV) dichloride, bis((2-oxoyl-3-(dibenzo-1H-pyrrole-1-yl)-5-(methyl)phenyl)-(4-methyl-2-phenoxy))-trans-cyclohexane-1,2-dimethylenyl-1,2-diylzirconium (IV) dimethyl, bis((2-oxoyl-3-(dibenzo-1H-pyrrole-1-yl)-5-(methyl)phenyl)-(4-methyl-2-phenoxy))-trans-cyclohexane-1,2-dimethylenyl-1,2-diylzirconium (IV) dichloride, bis((2-oxoyl-3-(1,1-dimethylethyl)phen-1-yl)-5-(methyl)phenyl)-(4-methyl-2-phenoxy))-trans-cyclohexane-1,2-dimethylenyl-1,2-diylzirconium (IV) dimethyl, bis((2-oxoyl-3-(1,1-dimethylethyl)phen-1-yl)-5-(methyl)phenyl)-(4-methyl-2-phenoxy))-trans-cyclohexane-1,2-dimethylenyl-1,2-diylzirconium (IV) dichloride, bis((2-oxoyl-3-(1,2,3,4,6,7,8,9-octahydroanthracen-5-yl)-5-(methyl)phenyl)-(4-methyl-2-phenoxy))-cis-cyclohexane-1,3-diylzirconium (IV) dimethyl, bis((2-oxoyl-3-(1,2,3,4,6,7,8,9-octahydroanthracen-5-yl)-5-(methyl)phenyl)-(4-methyl-2-phenoxy))-cis-cyclohexane-1,3-diylzirconium (IV) dichloride, bis((2-oxoyl-3-(dibenzo-1H-pyrrole-1-yl)-5-(methyl)phenyl)-(4-methyl-2-phenoxy))-cis-cyclohexane-1,3-diylzirconium (IV) dimethyl, bis((2-oxoyl-3-(dibenzo-1H-pyrrole-1-yl)-5-(methyl)phenyl)-(4-methyl-2-phenoxy))-cis-cyclohexane-1,3-diylzirconium (IV) dichloride, bis((2-oxoyl-3-(1,1-dimethylethyl)phen-1-yl)-5-(methyl)phenyl)-(4-methyl-2-phenoxy))-cis-cyclohexane-1,3-diylzirconium (IV) dimethyl, bis((2-oxoyl-3-(1,1-dimethylethyl)phen-1-yl)-5-(methyl)phenyl)-(4-methyl-2-phenoxy))-cis-cyclohexane-1,3-diylzirconium (1V) dichloride, bis((2-oxoyl-3-(1,2,3,4,6,7,8,9-octahydroanthracen-5-yl)-5-(methyl)phenyl)-(4-methyl-2-phenoxy))-cis-cyclohexene-1,2-dimethylenyl-1,2-diylzirconium (IV) dimethyl, bis((2-oxoyl-3-(1,2,3,4,6,7,8,9-octahydroanthracen-5-yl)-5-(methyl)phenyl)-(4-methyl-2-phenoxy))-cis-cyclohexene-1,2-dimethylenyl-1,2-diylzirconium (IV) dichloride, bis((2-oxoyl-3-(dibenzo-1H-pyrrole-1-yl)-5-(methyl)phenyl)-(4-methyl-2-phenoxy))-cis-cyclohexene-1,2-dimethylenyl-1,2-diylzirconium (IV) dimethyl, bis((2-oxoyl-3-(dibenzo-1H-pyrrole-1-yl)-5-(methyl)phenyl)-(4-methyl-2-phenoxy))-cis-cyclohexene-1,2-dimethylenyl-1,2-diylzirconium (IV) dichloride, bis((2-oxoyl-3-(1,1-dimethylethyl)phen-1-yl)-5-(methyl)phenyl)-(4-methyl-2-phenoxy))-cis-cyclohexene-1,2-dimethylenyl-1,2-diylzirconium (1V) dimethyl, bis((2-oxoyl-3-(1,1-dimethylethyl)phen-1-yl)-5-(methyl)phenyl)-(4-methyl-2-phenoxy))-cis-cyclohexene-1,2-dimethylenyl-1,2-diylzirconium (IV) dichloride, bis((2-oxoyl-3-(1,2,3,4,6,7,8,9-octahydroanthracen-5-yl)-5-(methyl)phenyl)-(4-methyl-2-phenoxy))butane-1,4-diylzirconium (IV) dimethyl, bis((2-oxoyl-3-(1,2,3,4,6,7,8,9-octahydroanthracen-5-yl)-5-(methyl)phenyl)-(4-methyl-2-phenoxy))butane-1,4-diylzirconium (IV) dichloride, bis((2-oxoyl-3-(dibenzo-1H-pyrrole-1-yl)-5-(methyl)phenyl)-(4-methyl-2-phenoxy))butane-1,4-diylzirconium (IV) dimethyl, bis((2-oxoyl-3-(dibenzo-1H-pyrrole-1-yl)-5-(methyl)phenyl)-(4-methyl-2-phenoxy))butane-1,4-diylzirconium (IV) dichloride, bis((2-oxoyl-3-(1,1-dimethylethyl)phen-1-yl)-5-(methyl)phenyl)-(4-methyl-2-phenoxy))butane-1,4-diylzirconium (IV) dimethyl, bis((2-oxoyl-3-(1,1-dimethylethyl)phen-1-yl)-5-(methyl)phenyl)-(4-methyl-2-phenoxy))butane-1,4-diylzirconium (IV) dichloride, C) bis((2-oxoyl-3-(1,2,3,4,6,7,8,9-octahydroanthracen-5-yl)-5-(methyl)phenyl)-(5-(2-methyl)propane-2-yl)-2-phenoxy)propane-1,2-diylzirconium (IV) dimethyl, bis((2-oxoyl-3-(1,2,3,4,6,7,8,9-octahydroanthracen-5-yl)-5-(methyl)phenyl)-(5-(2-methyl)propane-2-yl)propane-1,2-diylzirconium (IV) dichloride, bis((2-oxoyl-3-(dibenzo-1H-pyrrole-1-yl)-5-(methyl)phenyl)-(5-(2-methyl)propane-2-yl)propane-1,2-diylzirconium (IV) dimethyl, bis((2-oxoyl-3-(dibenzo-1H-pyrrole-1-yl)-5-(methyl)phenyl)-(5-(2-methyl)propane-2-yl)propane-1,2-diylzirconium (IV) dichloride, bis((2-oxoyl-3-(1,1-dimethylethyl)phen-1-yl)-5-(methyl)phenyl)-(5-(2-methyl)propane-2-yl)propane-1,2-diylzirconium (IV) dimethyl, bis((2-oxoyl-3-(1,1-dimethylethyl)phen-1-yl)-5-(methyl)phenyl)-(5-(2-methyl)propane-2-yl)propane-1,2-diylzirconium (IV) dichloride, bis((2-oxoyl-3-(1,2,3,4,6,7,8,9-octahydroanthracen-5-yl)-5-(methyl)phenyl)-(5-(2-methyl)propane-2-yl)-trans-cyclohexane-1,2-dimethylenyl-1,2-diylzirconium (IV) dimethyl, bis((2-oxoyl-3-(1,2,3,4,6,7,8,9-octahydroanthracen-5-yl)-5-(methyl)phenyl)-(5-(2-methyl)propane-2-yl)-trans-cyclohexane-1,2-dimethylenyl-1,2-diylzirconium (IV) dichloride, bis((2-oxoyl-3-(dibenzo-1H-pyrrole-1-yl)-5-(methyl)phenyl)-(5-(2-methyl)propane-2-yl)-trans-cyclohexane-1,2-dimethylenyl-1,2-diylzirconium (IV) dimethyl, bis((2-oxoyl-3-(dibenzo-1H-pyrrole-1-yl)-5-(methyl)phenyl)-(5-(2-methyl)propane-2-yl)-trans-cyclohexane-1,2-dimethylenyl-1,2-diylzirconium (IV) dichloride, bis((2-oxoyl-3-(1,1-dimethylethyl)phen-1-yl)-5-(methyl)phenyl)-(5-(2-methyl)propane-2-yl)-trans-cyclohexane-1,2-dimethylenyl-1,2-diylzirconium (IV) dimethyl, bis((2-oxoyl-3-(1,1-dimethylethyl)phen-1-yl)-5-(methyl)phenyl)-(5-(2-methyl)propane-2-yl)-trans-cyclohexane-1,2-dimethylenyl-1,2-diyl zirconium (IV) dichloride, bis((2-oxoyl-3-(1,2,3,4,6,7,8,9-octahydroanthracen-5-yl)-5-(methyl)phenyl)-(5-(2-methyl)propane-2-yl)-cis-cyclohexane-1,3-diylzirconium (IV) dimethyl, bis((2-oxoyl-3-(1,2,3,4,6,7,8,9-octahydroanthracen-5-yl)-5-(methyl)phenyl)-(5-(2-methyl)propane-2-yl)-cis-cyclohexane-1,3-diylzirconium (IV) dichloride, bis((2-oxoyl-3-(dibenzo-1H-pyrrole-1-yl)-5-(methyl)phenyl)-(5-(2-methyl)propane-2-yl)-cis-cyclohexane-1,3-diylzirconium (IV) dimethyl, bis((2-oxoyl-3-(dibenzo-1H-pyrrole-1-yl)-5-(methyl)phenyl)-(5-(2-methyl)propane-2-yl)-cis-cyclohexane-1,3-diylzirconium (IV) dichloride, bis((2-oxoyl-3-(1,1-dimethylethyl)phen-1-yl)-5-(methyl)phenyl)-(5-(2-methyl)propane-2-yl)-cis-cyclohexane-1,3-diylzirconium (IV) dimethyl, bis((2-oxoyl-3-(1,1-dimethylethyl)phen-1-yl)-5-(methyl)phenyl)-(5-(2-methyl)propane-2-yl)-cis-cyclohexane-1,3-diylzirconium (IV) dichloride, bis((2-oxoyl-3-(1,2,3,4,6,7,8,9-octahydroanthracen-5-yl)-5-(methyl)phenyl)-(5-(2-methyl)propane-2-yl)-cis-cyclohexene-1,2-dimethylenyl-1,2-diylzirconium (IV) dimethyl, bis((2-oxoyl-3-(1,2,3,4,6,7,8,9-octahydroanthracen-5-yl)-5-(methyl)phenyl)-(5-(2-methyl)propane-2-yl)-cis-cyclohexene-1,2-dimethylenyl-1,2-diylzirconium (IV) dichloride, bis((2-oxoyl-3-(dibenzo-1H-pyrrole-1-yl)-5-(methyl)phenyl)-(5-(2-methyl)propane-2-yl)-cis-cyclohexene-1,2-dimethylenyl-1,2-diylzirconium (IV) dimethyl,
bis((2-oxoyl-3-(dibenzo-1H-pyrrole-1-yl)-5-(methyl)phenyl)-(5-(2-methyl)propane-2-yl)-cis-cyclohexene-1,2-dimethylenyl-1,2-diylzirconium (IV) dichloride,
bis((2-oxoyl-3-(1,1-dimethylethyl)phen-1-yl)-5-(methyl)phenyl)-(5-(2-methyl)propane-2-yl)-cis-cyclohexene-1,2-dimethylenyl-1,2-diylzirconium (IV) dimethyl,
bis((2-oxoyl-3-(1,1-dimethylethyl)phen-1-yl)-5-(methyl)phenyl)-(5-(2-methyl)propane-2-yl)-cis-cyclohexene-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-(5-(2-methyl)propane-2-yl)butane-1,4-diylzirconium (IV) dimethyl,
bis((2-oxoyl-3-(1,2,3,4,6,7,8,9-octahydroanthracen-5-yl)-5-(methyl)phenyl)-(5-(2-methyl)propane-2-yl)butane-1,4-diylzirconium (IV) dichloride,
bis((2-oxoyl-3-(dibenzo-1H-pyrrole-1-yl)-5-(methyl)phenyl)-(5-(2-methyl)propane-2-yl)butane-1,4-diylzirconium (IV) dimethyl,
bis((2-oxoyl-3-(dibenzo-1H-pyrrole-1-yl)-5-(methyl)phenyl)-(5-(2-methyl)propane-2-yl)butane-1,4-diyl zirconium (IV) dichloride,
bis((2-oxoyl-3-(1,1-dimethylethyl)phen-1-yl)-5-(methyl)phenyl)-(5-(2-methyl)propane-2-yl)butane-1,4-diylzirconium (IV) dimethyl, and
bis((2-oxoyl-3-(1,1-dimethylethyl)phen-1-yl)-5-(methyl)phenyl)-(5-(2-methyl)propane-2-yl)butane-1,4-diylzirconium (IV) dichloride.

The foregoing metal complexes are conveniently prepared by standard metallation and ligand exchange procedures involving a source of the transition metal and a neutral polyfunctional ligand source. In addition, the complexes may also be prepared by means of an amide elimination and hydrocarbylation process starting from the corresponding transition metal tetraamide and a hydrocarbylating agent, such as trimethylaluminum. The techniques employed are the same as or analogous to those disclosed in U.S. Pat. Nos. 6,320,005, 6,103,657, WO 02/38628, WO 03/40195, US-A-2004/0220050, and elsewhere.

The metal complex is activated to form the active catalyst composition by combination with a cocatalyst, preferably a cation forming cocatalyst, especially a cationic compound containing a non-coordination anion or a neutral Lewis acid, preferably an alumoxane or neutral Lewis acid modified alumoxane, or a combination thereof. The activation may occur prior to addition of the catalyst composition to the reactor with or without the presence of other components of the reaction mixture, or in situ through separate addition of the metal complex and activating cocatalyst to the reactor.

Monomers

Suitable olefins for use herein include $C_{2-30}$ aliphatic-, cycloaliphatic- and aromatic-compounds containing one or more ethylenic unsaturations. Examples include aliphatic-, cycloaliphatic- and aromatic olefins or diolefins. Preferred olefin monomers include, but are not limited to, ethylene, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, vinylcyclo-hexane, styrene, cyclopentene, cyclohexene, cyclooctene, 1,3-butadiene, 1,3-pentadiene, 1,4-hexadiene, 1,5-hexadiene, 1,7-octadiene, 1,9-decadiene, 4-vinylcyclohexene, dicyclopentadiene, norbornadiene, ethylidenenorbornene, and mixtures thereof.

The novel processes described herein are well suited for the production of olefin polymers comprising monovinylidene aromatic monomers including styrene, o-methyl styrene, p-methyl styrene, t-butylstyrene, and mixtures thereof. In particular, interpolymers comprising ethylene and styrene can be advantageously prepared by following the teachings herein. Optionally, copolymers comprising ethylene, styrene and/or a $C_{3-20}$ alpha olefin, optionally comprising a conjugated or non-conjugated $C_{4-20}$ diene, having improved properties over those presently known in the art can be prepared.

Suitable non-conjugated dienes include straight chain-, branched chain- or cyclic-hydrocarbon dienes having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

Cocatalysts

Suitable cocatalysts include those compounds previously known in the art for use with Group 4 metal olefin polymerization complexes. Examples of suitable activating cocatalysts include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl) boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. Nos. 5,153,157, 5,064,802, 5,321,106, 5,721,185, 5,350,723, 5,425,872, 5,625,087, 5,883,204, 5,919,983, 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable cation forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)_g^+(A)^{g-}$$

wherein:
L* is a neutral Lewis base;
$(L^*-H)^+$ is a conjugate Bronsted acid of L*;
$A^{g-}$ is a noncoordinating, compatible anion having a charge of g−, and
g is an integer from 1 to 3.

More preferably $A^{g-}$ corresponds to the formula: $[M'Q_4]^-$;
wherein:
M' is boron or aluminum in the +3 formal oxidation state; and
Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silythydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

$$(L^*-H)^+(BQ_4)^-;$$

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:

trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl) borate, dimethyloctadecylammonium tetrakis (pentafluorophenyl)borate, methyldioctadecylammonium tetrakis(pentafluorophenyl), dialkyl ammonium salts such as:

di-(i-propyl)ammonium tetrakis(pentafluorophenyl)borate, methyloctadecylammonium tetrakis(pentafluorophenyl)borate, methyloctadodecylammonium tetrakis(pentafluorophenyl)borate, and dioctadecylammonium tetrakis (pentafluorophenyl)borate; tri-substituted phosphonium salts such as:

triphenylphosphonium tetrakis(pentafluorophenyl)borate, methyldioctadecylphosphonium tetrakis(pentafluorophenyl) borate, and tri(2,6-dimethylphenyl)phosphonium tetrakis (pentafluorophenyl)borate; di-substituted oxonium salts such as:

diphenyloxonium tetrakis(pentafluorophenyl)borate, di(o-tolyl)oxonium tetrakis(pentafluorophenyl)borate, and di(o-ctadecyl)oxonium tetrakis(pentafluorophenyl)borate; di-substituted sulfonium salts such as:

di(o-tolyl)sulfonium tetrakis(pentafluorophenyl)borate, and methylcotadecylsulfonium tetrakis(pentafluorophenyl) borate.

Preferred $(L^*-H)^+$ cations are methyldioctadecylammonium cations, dimethyloctadecylammonium cations, and ammonium cations derived from mixtures of trialkyl amines containing one or 2 $C_{14-18}$ alkyl groups. A particularly preferred example of the latter compound is based on a commercially available long chain amine and is referred to as: bis-(hydrogenated tallowalkyl)methylammonium tetrakis (pentafluorophenyl)borate.

Another suitable ion forming, activating cocatalyst comprises a salt of a cationic oxidizing agent and a noncoordinating, compatible anion represented by the formula:

$$(Ox^{h+})_g(A^{g-})_h,$$

wherein:

Ox$^{h+}$ is a cationic oxidizing agent having a charge of h+;
h is an integer from 1 to 3; and A$^{g-}$ and g are as previously defined.

Examples of cationic oxidizing agents include: ferrocenium, hydrocarbyl-substituted ferrocenium, Ag$^+$, or Pb$^{+2}$. Preferred embodiments of A$^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

wherein:

[C]$^+$ is a C$_{1-20}$ carbenium ion; and
A$^-$ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

wherein:

Q$^1$ is C$_{1-10}$ hydrocarbyl, and A$^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.,* 1993, 383-384, as well as Lambert, J. B., et al., *Organometallics,* 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

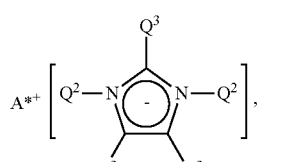

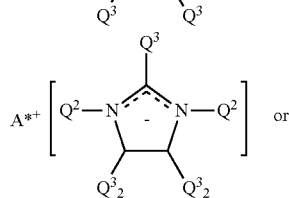

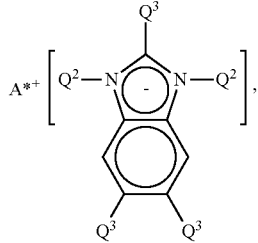

wherein:

A*$^+$ is a cation, especially a proton containing cation, and preferably is a trihydrocarbyl ammonium cation containing one or two C$_{10-40}$ alkyl groups, especially a methyldi (C$_{14-20}$ alkyl)ammonium cation, Q$^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably C$_{1-20}$ alkyl, and Q$^2$ is tris(pentafluorophenyl)borane or tris(pentafluorophenyl)alumane).

Examples of these catalyst activators include trihydrocarbylammonium-salts, especially, methyldi(C$_{14-20}$ alkyl)ammonium-salts of:
bis(tris(pentafluorophenyl)borane)imidazolide, bis(tris(pentafluorophenyl)borane)-2-undecylimidazolide, bis(tris(pentafluorophenyl)borane)-2-heptadecylimidazolide, bis(tris(pentafluorophenyl)borane)-4,5-bis(undecyl)imidazolide, bis(tris(pentafluorophenyl)borane)-4,5-bis(heptadecypimidazolide, bis(tris(pentafluorophenyl)borane)imidazolinide, bis(tris(pentafluorophenyl)borane)-2-undecylimidazolinide, bis(tris(pentafluorophenyl)borane)-2-heptadecylinaidazolinide, bis(tris(pentafluorophenyl)borane)-4,5-bis(undecyl)imidazolinide, bis(tris(pentafluorophenyl)borane)-4,5-bis(heptadecypimidazolinide, bis(tris(pentafluorophenyl)borane)-5,6-dimethylbenzimidazolide, bis(tris(pentafluorophenyl)borane)-5,6-bis(undecyl) benzimidazolide,
bis(tris(pentafluorophenyl)alumane)imidazolide, bis(tris(pentafluorophenyl)alumane)-2-undecylimidazolide, bis(tris(pentafluorophenyl)alumane)-2-heptadecylimidazolide, bis(tris(pentafluorophenypalumane)-4,5-bis(undecypimidazolide, bis(tris(pentafluorophenyl)alumane)-4,5-bis(heptadecyl)imidazolide, bis(tris(pentafluorophenyl)alumane)imidazolinide, bis(tris(pentafluorophenypalumane)-2-undecylimidazolinide, bis(tris(pentafluorophenypalumane)-2-heptadecylimidazolinide, bis(tris(pentafluorophenypalumane)-4,5-bis(undecypimidazolinide, bis(tris(pentafluorophenyl)alumane)-4,5-bis(heptadecyl)imidazolinide, bis(tris(pentafluorophenypalumane)-5,6-dimethylbenzimidazolide, and bis(tris(pentafluorophenypalumane)-5,6-bis(undecypbenzimidazolide.

Other activators include those described in PCT publication WO 98/07515 such as tris(2,2',2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869, 723, EP-A-615981, and PCT publication WO 98/32775.

As previously mentioned, suitable activating cocatalysts for use herein include polymeric or oligomeric alumoxanes, especially methalumoxane (MAO), triisobutyl aluminum modified methalumoxane (MMAO), or tri n-octylaluminum modified methalumoxane (OMAO); Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

All of the foregoing catalyst activators as well as any other know activator for transition metal complex catalysts may be employed alone or in combination according to the present invention.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, may be employed in lower quantity (<100:1) than the predominant catalyst literature, which is generally at least 100 times the quantity of metal complex on a molar basis, and more often around 1000 times this quantity. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

Process

In general, the polymerization may be accomplished at conditions well known in the prior art for olefin solution polymerization reactions. Preferred polymerization temperatures are dependent upon the comonomer content of the resulting polymer. For polymers of densities ranging from 0.865 to 0.885, the preferred temperatures range from 170-250° C., more preferably from 180-220° C. For polymers of densities ranging from 0.885 to 0.940, the preferred temperatures range from 190-250° C., more preferably from 195-250° C. Preferred polymerization pressures are from atmospheric to 3000 atmospheres (100 kPa to 300 MPa), more preferably from 1 MPa to 10 MPa. In most polymerization reactions the molar ratio of catalyst:polymerizable compound employed is from $10^{-12}$: 1 to $10^{-1}$:1, more preferably from $10^{-12}$:1 to $10^{-5}$:1. Highly desirably, the reaction is conducted under continuous, solution polymerization conditions, that is, conditions wherein the monomer or monomers are continuously added to a reactor operating under solution polymerization conditions, and polymerized product is continuously or semi-continuously, removed and recovered.

Desirably, the polymerization mixture comprises an aliphatic or alicyclic liquid diluent. Examples of such aliphatic or alicyclic liquid diluents include straight and branched-chain hydrocarbons such as isobutane, butane, pentane, hexane, heptane, octane, and mixtures thereof; alicyclic hydrocarbons such as cyclohexane, cycloheptane, methylcyclohexane, methylcyclo-heptane, and mixtures thereof; and perfluorinated hydrocarbons such as perfluorinated $C_{4-10}$ alkanes, and the like. Small quantities of aromatic hydrocarbons such as toluene, ethylbenzene or xylene may be included as well, but are not preferred. Mixtures of the foregoing are also suitable. A preferred liquid diluent is an hydrogenated oligomeric aliphatic hydrocarbon mixture having a distillation, ASTM D 86, IBP of 118° C., distillation, ASTM D 86, Dry Point of 137° C., and Specific Gravity, 15.6° C., ASTM D 1250 of 0.72 sold commercially under the trade designation Isopar™ E, available from ExxonMobil Corporation.

The use of molecular weight control agents or chain transfer agentS in the present process is desired. Examples of such molecular weight control agents include hydrogen, trialkyl aluminum compounds, or other known chain transfer agents. A particular benefit of the use of the present invention is the ability (depending on reaction conditions) to produce narrow molecular weight distribution ethylene/α-olefin interpolymers. Preferred polymers have Mw/Mn of less than 2.5, more preferably less than 2.3. Such narrow molecular weight distribution polymer products are highly desirable due to improved tensile strength properties as well as reduced levels of extractables.

Without limiting in any way the scope of the invention, one means for carrying out the present polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Catalyst along with cocatalyst and optional chain transfer agent are continuously or intermittently introduced in the reactor liquid phase or any recycled portion thereof. The reactor temperature may be controlled by adjusting the solvent/monorner ratio, the catalyst addition rate, as well as by use of cooling or heating coils, jackets or both. The polymerization rate is controlled by the rate of catalyst addition. Pressure is controlled by the monomer flow rate and partial pressures of volatile components. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the previously mentioned chain transfer agent. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process, the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, comonomer, catalyst or cocatalyst gradient established between differing regions thereof, optionally accompanied by separated addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

Supports may be employed in the present invention, especially in slurry or gas-phase polymerizations. Suitable supports include solid, particulated, high surface area, metal oxides, metalloid oxides, or mixtures thereof (interchangeably referred to herein as an inorganic oxide). Examples include: talc, silica, alumina, magnesia, titania, zirconia, Sn$_2$O$_3$, aluminosilicates, borosilicates, clays, and mixtures thereof. Suitable supports preferably have a surface area as determined by nitrogen porosimetry using the B.E.T. method from 10 to 1000 m$^2$/g, and preferably from 100 to 600 m$^2$/g. The average particle size typically is from 0.1 to 500 µm, preferably from 1 to 200 µm, more preferably 10 to 100 µm.

In one embodiment of the invention the present catalyst composition and optional support may be spray dried or otherwise recovered in solid, particulated form to provide a composition that is readily transported and handled. Suitable methods for spray drying a liquid-containing slurry are well known in the art and usefully employed herein. Preferred techniques for spray drying catalyst compositions for use herein are described in U.S. Pat. Nos. 5,648,310 and 5,672,669.

The polymerization is desirably carried out as a continuous polymerization, preferably a continuous, solution polymerization, in which catalyst components, monomers, and optionally solvent, adjuvants, scavengers, and polymerization aids are continuously supplied to the reaction zone and polymer product continuously removed there from. Within the scope of the terms "continuous" and "continuously" as used in this context are those processes in which there are intermittent additions of reactants and removal of products at small regular or irregular intervals, so that, over time, the overall process is substantially continuous.

The catalyst compositions can be advantageously employed in a high pressure, solution, slurry, or gas phase polymerization process. For a solution polymerization process it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion where either the metal complex or the cocatalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

Supported catalyst compositions may be prepared by depositing or chemically bonding the requisite components on an inert inorganic or organic particulated solid, as previously disclosed. In one embodiment, a heterogeneous catalyst is prepared by co-precipitating the metal complex and the reaction product of an inert inorganic compound and an active hydrogen containing activator, especially the reaction product of a tri(C$_{1-4}$ alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. dPreferably for use in gas phase polymerization processes, the support material and resulting catalyst has a median particle diameter from 20 to 200 µm, more preferably from 30 µm to 150 µm, and most preferably from 50 µm to 100 µm. Preferably for use in slurry polymerization processes, the support has a median particle diameter from 1 µm to 200 µm, more preferably from 5 µm to 100 µm, and most preferably from 10 µm to 80 µm.

Suitable gas phase polymerization process for use herein are substantially similar to known processes used commercially on a large scale for the manufacture of polypropylene, ethylene/α-olefin copolymers, and other olefin polymers. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate or fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid, this can suitably be fed to the bed to provide an evaporative cooling effect. The volatile liquid evaporates in the hot fluidized bed to form gas which mixes with the fluidizing gas. If the volatile liquid comprises a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP-89691; U.S. Pat. No. 4,543,399; WO-94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO-94/28032.

The polymerization reaction occurring in the gas fluidized bed is catalyzed by the continuous or semi-continuous addition of catalyst composition according to the invention. The catalyst composition may be subjected to a prepolymerization step, for example, by polymerizing a small quantity of olefin monomer in a liquid inert diluent, to provide a catalyst composite comprising supported catalyst particles embedded in olefin polymer particles as well.

The polymer is produced directly in the fluidized bed by polymerization of the monomer or mixture of monomers on the fluidized particles of catalyst composition, supported catalyst composition or prepolymerized catalyst composition within the bed. Start-up of the polymerization reaction is achieved using a bed of preformed polymer particles, which are preferably similar to or the same as the polymer to be produced, and conditioning the bed by drying with inert gas or nitrogen prior to introducing the catalyst composition, the monomers and any other gases which it is desired to have in the recycle gas stream, such as a diluent gas, hydrogen chain transfer agent, or an inert condensable gas when operating in gas phase condensing mode. The produced polymer is discharged continuously or semi-continuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor. Products are readily recovered by exposure to reduced pressure and optionally elevated temperatures (devolatilization) according to known techniques. Typically, the fluidized bed of the gas phase process is operated at temperatures greater than 50° C., preferably from 60° C. to 110° C., more preferably from 70° C. to 110° C. Examples of gas phase processes which are adaptable for use in the process of this invention are disclosed in U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; and 5,616,661.

Specific Embodiments

The following embodiments are provided for purposes of specific disclosure for the appended claims.

1. A process for polymerization of ethylene and optionally one or more α-olefins under continuous, solution polymerization conditions to prepare a high molecular weight polymer, said process comprising conducting the polymerization in the presence of a catalyst composition comprising a transition metal complex and an activating cocatalyst under conditions that result in a value for the polymerization index, $\Psi$, that is greater than or equal to zero as determined by the following equation:

$$\Psi = \beta_0 \beta_1 T + \beta_2 X + \beta_3 E + \beta_4 \rho + \beta_5 I_2,$$

where, T is the polymerization temperature in degrees Celsius, X is the ethylene conversion in the reactor in mol percent, E is the catalyst efficiency in g polymer produced per g of metal in the metal complex fed to the reactor per unit time, $\rho$ is the resulting polymer density in units of g/ml, $I_2$ is the melt index of the polymer in units of dg/minute, and the equation constants, $\beta_0$-$\beta_5$, are unitless numbers having the values defined in the following table:

| Equation Constant | Value |
|---|---|
| $\beta_0$ | −13796.073 |
| $\beta_1$ | 111.445393 |
| $\beta_2$ | 137.437524 |
| $\beta_3$ | 62.5876298 |

-continued

| Equation Constant | Value |
|---|---|
| $\beta_4$ | −18931.8878 |
| $\beta_5$ | −108.320017 |

2. The process of embodiment 1 wherein the resulting polymer has a molecular weight distribution, Mw/Mn, less than 3.0.

3. The process of embodiment 1 wherein the catalyst composition additionally comprises a chain transfer agent.

The process of embodiment 3 wherein the quantity of chain transfer agent present in the reactor is sufficient to decrease the Mw of the resulting polymer at least 30 percent compared to the molecular weight of the resulting polymer prepared in the absence of a chain transfer agent.

5. The process of embodiment 3 wherein the chain transfer agent is hydrogen, present in an amount from 0.015 to 2.0 mol percent (based on monomer content).

6. The process of embodiment 1 wherein the ethylene conversion is at least 85 mol percent.

7. The process of any one of embodiments 1-0.6 wherein ethylene and one or more $C_{3-20}$ α-olefins are copolymerized.

8. The process of embodiment 7 wherein ethylene and one or more $C_{6-20}$ α-olefins are copolymerized.

9. The process of embodiment 1 conducted at a temperature from 185 to 250° C. in the presence of a chain transfer agent to prepare a polymer having a density between 0.885 and 0.950 g/cm³, a melt index, $I_2$, <2.0, a molecular weight distribution Mw/Mn<3.0, and a catalyst efficiency of greater than 0.5 $g_{polymer}/\mu g_{metal}$.

10. The process of embodiment 9 wherein the chain transfer agent is present in a quantity such that the decrease in Mw of the resulting polymer is >30 percent compared to the Mw of the resulting polymer made in the absence of chain transfer agent.

11. The process of embodiment 10 wherein the chain transfer agent is hydrogen present in the reactor in an amount of from 0.015 to 2 mol percent based on ethylene.

12. The process of any one of embodiments 9-11 wherein ethylene and one or more $c_{3-20}$ α-olefins are copolymerized.

13. The process of embodiment 12 wherein ethylene and one or more $C_{6-20}$ α-olefins are copolymerized.

14. The process of embodiment 1 conducted at a temperature from 170 to 250° C. in the presence of a chain transfer agent to prepare a polymer having a density between 0.885 and 0.950 g/cm³, a melt index, $I_2$, <2.0, a molecular weight distribution Mw/Mn<3.0, and a catalyst efficiency of greater than 0.5 $g_{polymer}/\mu g_{metal}$.

15. The process of embodiment 14 wherein the chain transfer agent is present in a quantity such that the decrease in Mw of the resulting polymer is >30 percent compared to the Mw of the resulting polymer made in the absence of chain transfer agent.

16. The process of embodiment 15 wherein the chain transfer agent is hydrogen present in the reactor in an amount of from 0.015 to 2 mol percent based on ethylene.

17. The process of any one of embodiments 14-16 wherein ethylene and one or more $C_{3-20}$ α-olefins are copolymerized.

18. The process of embodiment 17 wherein ethylene and one or more $C_{6-20}$ α-olefins are copolymerized.

19. The process of embodiment 1 conducted at a temperature from 130 to 250° C. and an ethylene conversion of at least 80 mol percent, in the presence of a chain transfer agent to prepare a polymer having a density between 0.865 and 0.950 g/cm³, a melt index, $I_2$, from 0.01 to 100, a molecular weight distribution Mw/Mn<3.0, and a catalyst efficiency of greater than 0.5 $g_{polymer}/\mu g_{metal}$, and wherein the activating cocatalyst is oligomeric or polymeric alumoxane or modified alumoxane present in an amount to provide a molar ratio, Al:metal complex, from 20-200.

20. The process of embodiment 19 wherein the oligomeric or polymeric alumoxane or modified alumoxane is present in an amount to provide a molar ratio, Al:metal complex, from 30-150.

21. The process of embodiment 20 wherein the oligomeric or polymeric alumoxane or modified alumoxane is present in an amount to provide a molar ratio, Al:metal complex, from 40-80.

22. The process of any one of embodiments 19-21 wherein the oligomeric or polymeric alumoxane or modified alumoxane is selected from the group consisting of methylalumoxane, isobutylalumoxane; and Lewis acid modified alumoxanes.

23. The process of embodiment 22 wherein the Lewis acid modified alumoxane is trialkyl aluminum-, perhalogenated tri(hydrocarbyl)aluminum-, or perhalogenated tri(hydrocarbyl)boron modified methylalumoxane.

24. The process of embodiment 23 wherein the Lewis acid modified alumoxane is triisobutyl aluminum-modified methylalumoxane, tri-n-octyl aluminum-modified methylalumoxane, or tris(pentafluorophenyl)boron-modified methylalumoxane.

25. The process of any one of embodiments 19-24 wherein the chain transfer agent is present in a quantity such that the decrease in Mw of the resulting polymer is >30 percent compared to the Mw of the resulting polymer made in the absence of chain transfer agent.

26. The process of embodiment 25 wherein the chain transfer agent is hydrogen present in the reactor in an amount of from 0.015 to 2 mol percent based on ethylene.

27. The process of any one of embodiments 1-6 conducted in a single reactor and the catalyst composition comprises at least two metal complexes or metal compounds.

28. The process of any one of embodiments 1-6 conducted in at least one reactor of two or more reactors connected in series or in parallel.

29. The process of embodiment 28 wherein the catalyst composition comprises at least two metal complexes.

30. A process for polymerization of one or more addition polymerizable monomers to prepare a high Molecular weight polymer, said process comprising conducting the polymerization in the presence of a catalyst composition comprising a transition metal complex and an activating cocatalyst wherein the metal complex corresponds to the formula:

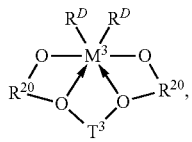

where:
$R^{20}$ is an aliphatic, aromatic or inertly substituted aromatic group containing from 5 to 20 atoms not counting hydrogen, or a polyvalent derivative thereof;
$T^3$ is a hydrocarbylene or silane group having from 1 to 20 atoms not counting hydrogen, or an inertly substituted derivative thereof;

$M^3$ is a Group 4 metal, preferably zirconium or hafnium;
$R^D$ independently each occurrence is a monovalent ligand group or two $R^D$ groups together are a divalent hydrocarbylene or hydrocarbadiyl group; and bonds and electron donative interactions are represented by lines and arrows respectively.

31. The process of embodiment 30 wherein the metal complex correspond to the formula:

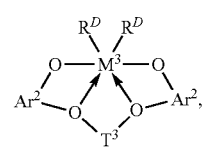

wherein:
$T^3$ is a divalent bridging group of from 2 to 20 atoms not counting hydrogen, preferably a substituted or unsubstituted, $C_{3-6}$ alkylene group; and
$Ar^2$ independently each occurrence is an arylene or an alkyl-, aryl-, alkoxy- or amino-substituted arylene group of from 6 to 20 atoms not counting hydrogen and not counting the substituents;
$M^3$ is a Group 4 metal, preferably hafnium or zirconium;
$R^D$ independently each occurrence is a monovalent ligand group or two $R^D$ groups together are a divalent hydrocarbylene or hydrocarbadiyl group; and electron donative interactions are represented by arrows.

32. The process of embodiment 31 wherein the metal complex corresponds to the formula:

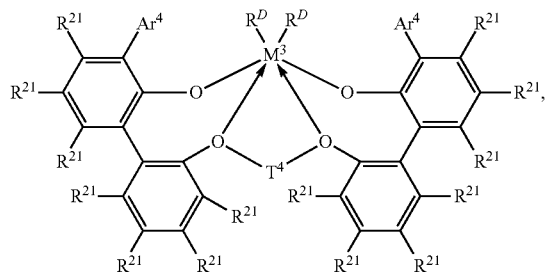

where $M^3$ is Hf or Zr;
$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl and
$T^4$ independently each occurrence comprises a $C_{3-6}$ alkylene group, a $C_{3-6}$ cycloalkylene group, or an inertly substituted derivative thereof;
$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and
$R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl groups.

33. The process of embodiment 32 wherein $M^3$ is Zr.

34. The process of embodiment 33 wherein the metal complex is selected from the group consisting of:
A) bis((2-oxoyl-3-(1,2,3,4,6,7,8,9-octahydroanthracen-5-yl)-5-(methyl)phenyl)-2-phenoxy)propane-1,2-diylzirconium (N) dimethyl, bis((2-oxoyl-3-(1,2,3,4,6,7,8,9-octahydroanthracen-5-yl)-5-(methyl)phenyl)-2-phenoxy)propane-1,2-diylzirconium (IV) dichloride,
bis((2-oxoyl-3-(dibenzo-1H-pyrrole-1-yl)-5-(methyl)phenyl)-2-phenoxy)propane-1,2-diyl zirconium (IV) dimethyl,
bis((2-oxoyl-3-(dibenzo-1H-pyrrole-1-yl)-5-(methyl)phenyl)-2-phenoxy)propane-1,2-diylzirconium (IV) dichloride,
bis((2-oxoyl-3-(1,1-dimethylethyl)phen-1-yl)-5-(methyl)phenyl)-2-phenoxy)propane-1,2-diylzirconium (IV) dimethyl,
bis((2-oxoyl-3-(1,1-dimethylethyl)phen-1-yl)-5-(methyl)phenyl)-2-phenoxy)propane-1,2-diylzirconium (N) dichloride,
bis((2-oxoyl-3-(1,2,3,4,6,7,8,9-octahydroanthracen-5-yl)-5-(methyl)phenyl)-2-phenoxy)-trans-cyclohexane-1,2-dimethylenyl-1,2-diylzirconium (IV) dimethyl,
bis((2-oxoyl-3-(1,2,3,4,6,7,8,9-octahydroanthracen-5-yl)-5-(methyl)phenyl)-2-phenoxy)-trans-cyclohexane-1,2-dimethylenyl-1,2-diylzirconium (IV) dichloride,
bis((2-oxoyl-3-(dibenzo-1H-pyrrole-1-yl)-5-(methyl)phenyl)-2-phenoxy)-trans-cyclohexane-1,2-dimethylenyl-1,2-diylzirconium (IV) dimethyl,
bis((2-oxoyl-3-(dibenzo-1H-pyrrole-1-yl)-5-(methyl)phenyl)-2-phenoxy)-trans-cyclohexane-1,2-dimethylenyl-1,2-diylzirconium (N) dichloride,
bis((2-oxoyl-3-(1,1-dimethylethyl)phen-1-yl)-5-(methyl)phenyl)-2-phenoxy)-trans-cyclohexane-1,2-dimethylenyl-1,2-diylzirconium (IV) dimethyl,
bis((2-oxoyl-3-(1,1-dimethylethyl)phen-1-yl)-5-(methyl)phenyl)-2-phenoxy)-trans-cyclohexane-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-2-phenoxy)-cis-cyclohexane-1,3-diylzirconium (IV) dimethyl,
bis((2-oxoyl-3-(1,2,3,4,6,7,8,9-octahydroanthracen-5-yl)-5-(methyl)phenyl)-2-phenoxy)-cis-cyclohexane-1,3-diylzirconium (N) dichloride,
bis((2-oxoyl-3-(dibenzo-1H-pyrrole-1-yl)-5-(methyl)phenyl)-2-phenoxy)-cis-cyclohexane-1,3-diylzirconium (IV) dimethyl,
bis((2-oxoyl-3-(dibenzo-1H-pyrrole-1-yl)-5-(methyl)phenyl)-2-phenoxy)-cis-cyclohexane-1,3-diylzirconium (IV) dichloride,
bis((2-oxoyl-3-(1,1-dimethylethyl)phen-1-yl)-5-(methyl)phenyl)-2-phenoxy)-cis-cyclohexane-1,3-diylzirconium (IV) dimethyl,
bis((2-oxoyl-3-(1,1-dimethylethyl)phen-1-yl)-5-(methyl)phenyl)-2-phenoxy)-cis-cyclohexane-1,3-diylzirconium (IV) dichloride,
bis((2-oxoyl-3-(1,2,3,4,6,7,8,9-octahydroanthracen-5-yl)-5-(methyl)phenyl)-2-phenoxy)-cis-cyclohexene-1,2-dimethylenyl-1,2-diylzirconium (IV) dimethyl,
bis((2-oxoyl-3-(1,2,3,4,6,7,8,9-octahydroanthracen-5-yl)-5-(methyl)phenyl)-2-phenoxy)-cis-cyclohexene-1,2-dimethylenyl-1,2-diylzirconium (IV) dichloride,
bis((2-oxoyl-3-(dibenzo-1H-pyrrole-1-yl)-5-(methyl)phenyl)-2-phenoxy)-cis-cyclohexene-1,2-dimethylenyl-1,2-diylzirconium (IV) dimethyl,
bis((2-oxoyl-3-(dibenzo-1H-pyrrole-1-yl)-5-(methyl)phenyl)-2-phenoxy)-cis-cyclohexene-1,2-dimethylenyl-1,2-diylzirconium (N) dichloride,
bis((2-oxoyl-3-(1,1-dimethylethyl)phen-1-yl)-5-(methyl)phenyl)-2-phenoxy)-cis-cyclohexene-1,2-dimethylenyl-1,2-diylzirconium (IV) dimethyl,
bis((2-oxoyl-3-(1,1-dimethylethyl)phen-1-yl)-5-(methyl)phenyl)-2-phenoxy)-cis-cyclohexene-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-2-phenoxy)butane-1,4-diylzirconium (IV) dimethyl,
bis((2-oxoyl-3-(1,2,3,4,6,7,8,9-octahydroanthracen-5-yl)-5-(methyl)phenyl)-2-phenoxy)butane-1,4-diylzirconium (IV) dichloride,
bis((2-oxoyl-3-(dibenzo-1H-pyrrole-1-yl)-5-(methyl)phenyl)-2-phenoxy)butane-1,4-diylzirconium (IV) dimethyl,
bis((2-oxoyl-3-(dibenzo-1H-pyrrole-1-yl)-5-(methyl)phenyl)-2-phenoxy)butane-1,4-diylzirconium (IV) dichloride,
bis((2-oxoyl-3-(1,1-dimethylethyl)phen-1-yl)-5-(methyl)phenyl)-2-phenoxy)butane-1,4-diylzirconium (IV) dimethyl,
bis((2-oxoyl-3-(1,1-dimethylethyl)phen-1-yl)-5-(methyl)phenyl)-2-phenoxy)butane-1,4-diylzirconium (IV) dichloride,
B) bis((2-oxoyl-3-(1,2,3,4,6,7,8,9-octahydroanthracen-5-yl)-5-(methyl)phenyl)-(4-methyl-2-phenoxy))propane-1,2-diylzirconium (IV) dimethyl,
bis((2-oxoyl-3-(1,2,3,4,6,7,8,9-octahydroanthracen-5-yl)-5-(methyl)phenyl)-(4-methyl-2-phenoxy))propane-1,2-diylzirconium (IV) dichloride,
bis((2-oxoyl-3-(dibenzo-1H-pyrrole-1-yl)-5-(methyl)phenyl)-(4-methyl-2-phenoxy))propane-1,2-diylzirconium (IV) dimethyl,
bis((2-oxoyl-3-(dibenzo-1H-pyrrole-1-yl)-5-(methyl)phenyl)-(4-methyl-2-phenoxy))propane-1,2-diylzirconium (1V) dichloride,
bis((2-oxoyl-3-(1,1-dimethylethyl)phen-1-yl)-5-(methyl)phenyl)-(4-methyl-2-phenoxy))propane-1,2-diylzirconium (IV) dimethyl,
bis((2-oxoyl-3-(1,1-dimethylethyl)phen-1-yl)-5-(methyl)phenyl)-(4-methyl-2-phenoxy))propane-1,2-diylzirconium (IV) dichloride,
bis((2-oxoyl-3-(1,2,3,4,6,7,8,9-octahydroanthracen-5-yl)-5-(methyl)phenyl)-(4-methyl-2-phenoxy))-trans-cyclohexane-1,2-dimethylenyl-1,2-diylzirconium (N) dimethyl,
bis((2-oxoyl-3-(1,2,3,4,6,7,8,9-octahydroanthracen-5-yl)-5-(methyl)phenyl)-(4-methyl-2-phenoxy))-trans-cyclohexane-1,2-dimethylenyl-1,2-diylzirconium (IV) dichloride,
bis((2-oxoyl-3-(dibenzo-1H-pyrrole-1-yl)-5-(methyl)phenyl)-(4-methyl-2-phenoxy))-trans-cyclohexane-1,2-dimethylenyl-1,2-diylzirconium (IV) dimethyl,
bis((2-oxoyl-3-(dibenzo-1H-pyrrole-1-yl)-5-(methyl)phenyl)-(4-methyl-2-phenoxy))-trans-cyclohexane-1,2-dimethylenyl-1,2-diylzirconium (IV) dichloride,
bis((2-oxoyl-3-(1,1-dimethylethyl)phen-1-yl)-5-(methyl)phenyl)-(4-methyl-2-phenoxy))-trans-cyclohexane-1,2-dimethylenyl-1,2-diylzirconium (IV) dimethyl,
bis((2-oxoyl-3-(1,1-dimethylethyl)phen-1-yl)-5-(methyl)phenyl)-(4-methyl-2-phenoxy))-trans-cyclohexane-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-cyclohexane-1,3-diylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-cyclohexane-1,3-diylzirconium (IV) dichloride,
bis((2-oxoyl-3-(dibenzo-1H-pyrrole-1-yl)-5-(methyl)phenyl)-(4-methyl-2-phenoxy))-cis-cyclohexane-1,3-diylzirconium (IV) dimethyl, bis((2-oxoyl-3-(dibenzo-1H-pyrrole-1-yl)-5-(methyl)phenyl)-(4-methyl-2-phenoxy))-cis-cyclohexane-1,3-diylzirconium (IV) dichloride,
bis((2-oxoyl-3-(1,1-dimethylethyl)phen-1-yl)-5-(methyl)phenyl)-(4-methyl-2-phenoxy))-cis-cyclohexane-1,3-diylzirconium (IV) dimethyl,
bis((2-oxoyl-3-(1,1-dimethylethyl)phen-1-yl)-5-(methyl)phenyl)-(4-methyl-2-phenoxy))-cis-cyclohexane-1,3-diylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-cyclohexene-1,2-dimethylenyl-1,2-diylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-cyclohexene-1,2-dimethylenyl-1,2-diylzirconium (IV) dichloride,
bis((2-oxoyl-3-(dibenzo-1H-pyrrole-1-yl)-5-(methyl)phenyl)-(4-methyl-2-Phenoxy))-cis-cyclohexene-1,2-dimethylenyl-1,2-diylzirconium (IV) dimethyl,
bis((2-oxoyl-3-(dibenzo-1H-pyrrole-1-yl)-5-(methyl)phenyl)-(4-methyl-2-phenoxy))-cis-cyclohexene-1,2-dimethylenyl-1,2-diylzirconium (IV) dichloride,
bis((2-oxoyl-3-(1,1-dimethylethyl)phen-1-yl)-5-(methyl)phenyl)-(4-methyl-2-phenoxy))-cis-cyclohexene-1,2-dimethylenyl-1,2-diylzirconium (IV) dimethyl,
bis((2-oxoyl-3-(1,1-dimethylethyl)phen-1-yl)-5-(methyl)phenyl)-(4-methyl-2-phenoxy))-cis-cyclohexene-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-(4-methyl-2-phenoxy))butane-1,4-diylzirconium (IV) dimethyl,
bis((2-oxoyl-3-(1,2,3,4,6,7,8,9-octahydroanthracen-5-yl)-5-(methyl)phenyl)-(4-methyl-2-phenoxy))butane-1,4-diylzirconium (IV) dichloride,
bis((2-oxoyl-3-(dibenzo-1H-pyrrole-1-yl)-5-(methyl)phenyl)-(4-methyl-2-phenoxy))butane-1,4-diylzirconium (N) dimethyl,
bis((2-oxoyl-3-(dibenzo-1H-pyrrole-1-yl)-5-(methyl)phenyl)-(4-methyl-2-phenoxy))butane-1,4-diylzirconium (N) dichloride,
bis((2-oxoyl-3-(1,1-dimethylethyl)phen-1-yl)-5-(methyl)phenyl)-(4-methyl-2-phenoxy))butane-1,4-diylzirconium (IV) dimethyl,
bis((2-oxoyl-3-(1,1-dimethylethyl)phen-1-yl)-5-(methyl)phenyl)-(4-methyl-2-phenoxy))butane-1,4-diylzirconium (N) dichloride,
C)  bis((2-oxoyl-3-(1,2,3,4,6,7,8,9-octahydroanthracen-5-yl)-5-(methyl)phenyl)-(5-(2-methyl)propane-2-yl)-2-phenoxy)propane-1,2-diylzirconium (IV) dimethyl,
bis((2-oxoyl-3-(1,2,3,4,6,7,8,9-octahydroanthracen-5-yl)-5-(methyl)phenyl)-(5-(2-methyl)propane-2-yl)propane-1,2-diylzirconium (IV) dichloride,
bis((2-oxoyl-3-(dibenzo-1H-pyrrole-1-yl)-5-(methyl)phenyl)-(5-(2-methyl)propane-2-yl)propane-1,2-diylzirconium (IV) dimethyl,
bis((2-oxoyl-3-(dibenzo-1H-pyrrole-1-yl)-5-(methyl)phenyl)-(5-(2-methyl)propane-2-yl)propane-1,2-diylzirconium (IV) dichloride,
bis((2-oxoyl-3-(1,1-dimethylethyl)phen-1-yl)-5-(methyl)phenyl)-(5-(2-methyl)propane-2-yl)propane-1,2-diylzirconium (IV) dimethyl,
bis((2-oxoyl-3-(1,1-dimethylethyl)phen-1-yl)-5-(methyl)phenyl)-(5-(2-methyl)propane-2-yl)propane-1,2-diylzirconium (IV) dichloride,
bis((2-oxoyl-3-(1,2,3,4,6,7,8,9-octahydroanthracen-5-yl)-5-(methyl)phenyl)-(5-(2-methyl)propane-2-yl)-trans-cyclohexane-1,2-dimethylenyl-1,2-diylzirconium (IV) dimethyl,
bis((2-oxoyl-3-(1,2,3,4,6,7,8,9-octahydroanthracen-5-yl)-5-(methyl)phenyl)-(5-(2-methyl)propane-2-yl)-trans-cyclohexane-1,2-dimethylenyl-1,2-diylzirconium (IV) dichloride,
bis((2-oxoyl-3-(dibenzo-1H-pyrrole-1-yl)-5-(methyl)phenyl)-(5-(2-methyl)propane-2-yl)-trans-cyclohexane-1,2-dimethylenyl-1,2-diylzirconium (IV) dimethyl,
bis((2-oxoyl-3-(dibenzo-1H-pyrrole-1-yl)-5-(methyl)phenyl)-(5-(2-methyl)propane-2-yl)-trans-cyclohexane-1,2-dimethylenyl-1,2-diylzirconium (IV) dichloride,
bis((2-oxoyl-3-(1,1-dimethylethyl)phen-1-yl)-5-(methyl)phenyl)-(5-(2-methyl)propane-2-yl)-trans-cyclohexane-1,2-dimethyl enyl-1,2-diylzirconium (IV) dimethyl,
bis((2-oxoyl-3-(1,1-dimethylethyl)phen-1-yl)-5-(methyl)phenyl)-(5-(2-methyl)propane-2-yl)-trans-cyclohexane-1,2-dimethyl enyl-1,2-diylzirconium (N) dichloride,
bis((2-oxoyl-3-(1,2,3,4,6,7,8,9-octahydroanthracen-5-yl)-5-(methyl)phenyl)-(5-(2-methyl)propane-2-yl)-cis-cyclohexane-1,3-diylzirconium (IV) dimethyl,
bis((2-oxoyl-3-(1,2,3,4,6,7,8,9-octahydroanthracen-5-yl)-5-(methyl)phenyl)-(5-(2-methyl)propane-2-yl)-cis-cyclohexane-1,3-diylzirconium (IV) dichloride,
bis((2-oxoyl-3-(dibenzo-1H-pyrrole-1-yl)-5-(methyl)phenyl)-(5-(2-methyl)propane-2-yl)-cis-cyclohexane-1,3-diylzirconium (N) dimethyl,
bis((2-oxoyl-3-(dibenzo-1H-pyrrole-1-yl)-5-(methyl)phenyl)-(5-(2-methyl)propane-2-yl)-cis-cyclohexane-1,3-diylzirconium (IV) dichloride,
bis((2-oxoyl-3-(1,1-dimethylethyl)phen-1-yl)-5-(methyl)phenyl)-(5-(2-methyl)propane-2-yl)-cis-cyclohexane-1,3-diylzirconium (IV) dimethyl,
bis((2-oxoyl-3-(1,1-dimethylethyl)phen-1-yl)-5-(methyl)phenyl)-(5-(2-methyl)propane-2-yl)-cis-cyclohexane-1,3-diylzirconium (IV) dichloride,
bis((2-oxoyl-3-(1,2,3,4,6,7,8,9-octahydroanthracen-5-yl)-5-(methyl)phenyl)-(5-(2-methyl)propane-2-yl)-cis-cyclohexene-1,2-dimethylenyl-1,2-diylzirconium (IV) dimethyl,
bis((2-oxoyl-3-(1,2,3,4,6,7,8,9-octahydroanthracen-5-yl)-5-(methyl)phenyl)-(5-(2-methyl)propane-2-yl)-cis-cyclohexene-1,2-dimethylenyl-1,2-diylzirconium (IV) dichloride,
bis((2-oxoyl-3-(dibenzo-1H-pyrrole-1-yl)-5-(methyl)phenyl)-(5-(2-methyl)propane-2-yl)-cis-cyclohexene-1,2-dimethylenyl-1,2-diylzirconium (N) dimethyl,
bis((2-oxoyl-3-(dibenzo-1H-pyrrole-1-yl)-5-(methyl)phenyl)-(5-(2-methyl)propane-2-yl)-cis-cyclohexene-1,2-dimethylenyl-1,2-diylzirconium (IV) dichloride,
bis((2-oxoyl-3-(1,1-dimethylethyl)phen-1-yl)-5-(methyl)phenyl)-(5-(2-methyl)propane-2-yl)-cis-cyclohexene-1,2-dimethylenyl-1,2-diylzirconium (IV) dimethyl,
bis((2-oxoyl-3-(1,1-dimethylethyl)phen-1-yl)-5-(methyl)phenyl)-(5-(2-methyl)propane-2-yl)-cis-cyclohexene-1,2-dimethylenyl-1,2-diylzirconium (IV) dichloride,
bis((2-oxoyl-3-(1,2,3,4,6,7,8,9-octahydroanthracen-5-yl)-5-(methyl)phenyl)-(5-(2-methyl)propane-2-yl)butane-1,4-diylzirconium (IV) dimethyl,
bis((2-oxoyl-3-(1,2,3,4,6,7,8,9-octahydroanthracen-5-yl)-5-(methyl)phenyl)-(5-(2-methyl)propane-2-yl)butane-1,4-diylzirconium (IV) dichloride,
bis((2-oxoyl-3-(dibenzo-1H-pyrrole-1-yl)-5-(methyl)phenyl)-(5-(2-methyl)propane-2-yl)butane-1,4-diylzirconium (IV) dimethyl,
bis((2-oxoyl-3-(dibenzo-1H-pyrrole-1-yl)-5-(methyl)phenyl)-(5-(2-methyl)propane-2-yl)butane-1,4-diylzirconium (IV) dichloride, bis((2-oxoyl-3-(1,1-dimethylethyl)phen-1-yl)-5-(methyl) phenyl)-(5-(2-methyl)propane-2-yl)butane-1,4-diylzirconium (IV) dimethyl, and bis((2-oxoyl-3-(1,1-dimethyl ethyl)phen-1-yl)-5-(methyl) phenyl)-(5-(2-methyl)propane-2-yl)butane-1,4-diylzirconium (IV) dichloride.

It is understood that the present invention is operable in the absence of any component which has not been specifically disclosed and may be combined with any other suitable reaction or process in a multistep polymerization system design. The following examples are provided in order to further illustrate the invention and are not to be construed as limiting. Unless stated to the contrary, all parts and percentages are expressed on a weight basis.

EXAMPLES 1-10

Preparation of Metal Complex

The synthetic procedures of US-A-2004/0010103 were substantially repeated to prepare metal complexes A1-A10.

A1

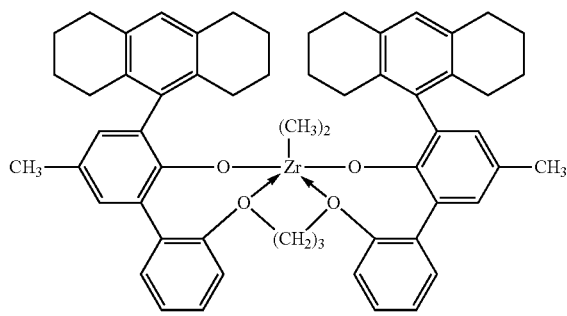

bis((2-oxoyl-3-(1,2,3,4,6,7,8,9-octahydro-anthracen-5-yl)-5-(methyl)phenyl)-2-phenoxy)-propane-1,3-diyl zirconium (IV) dimethyl

A2

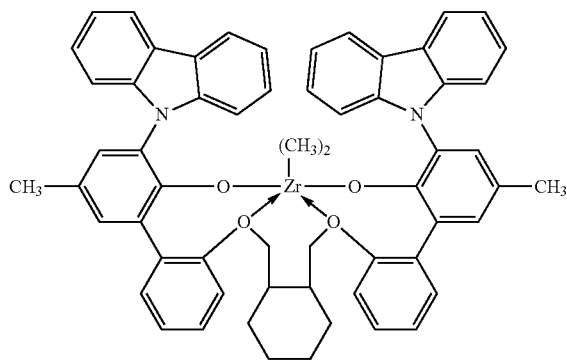

bis((2-oxoyl-3-(dibenzo-1H-pyrrole-1-yl)-5-(methyl)phenyl)-2-phenoxymethyl)-trans-cyclohexane-1,2-dimethylenyl zirconium (IV) dimethyl

A3

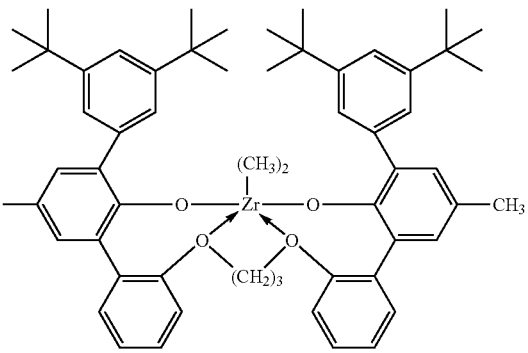

bis((2-oxoyl-3-(3,5-di-(1,1-dimethyl-ethyl) phen-1-yl)-5-(methyl)phenyl)-2-phenoxy)-propane-1,3-diyl zirconium (IV) dimethyl

A4

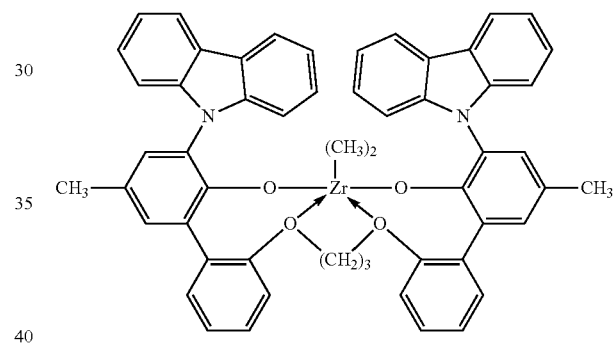

bis((2-oxoyl-3-(dibenzo-1H-pyrrole-1-yl)-5-(methyl)phenyl)-2-phenoxy)-propane-1,3-diyl zirconium (IV) dimethyl

A5

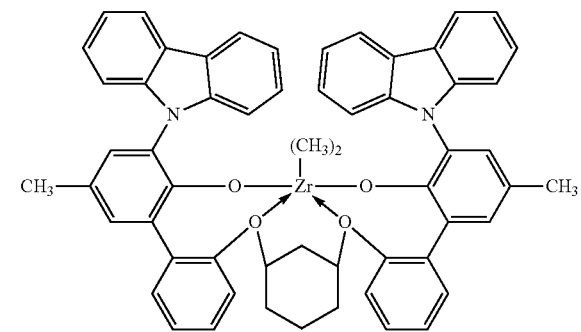

bis((2-oxoyl-3-(dibenzo-1H-pyrrole-1-yl)-5-(methyl)phenyl)-2-phenoxymethyl)-cis-cyclohexane-1,3-diyl zirconium (IV) dimethyl -continued

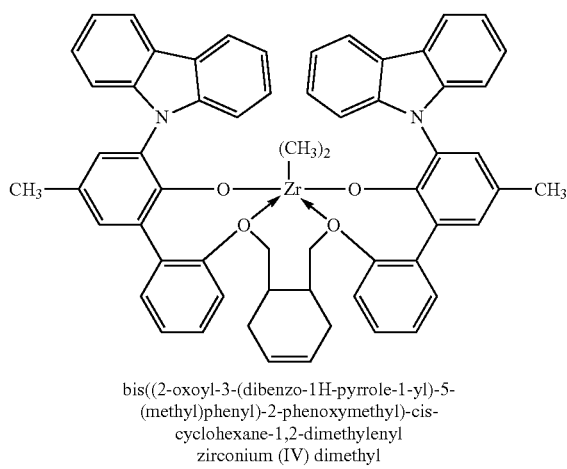

bis((2-oxoyl-3-(dibenzo-1H-pyrrole-1-yl)-5-(methyl)phenyl)-2-phenoxymethyl)-cis-cyclohexane-1,2-dimethylenyl zirconium (IV) dimethyl

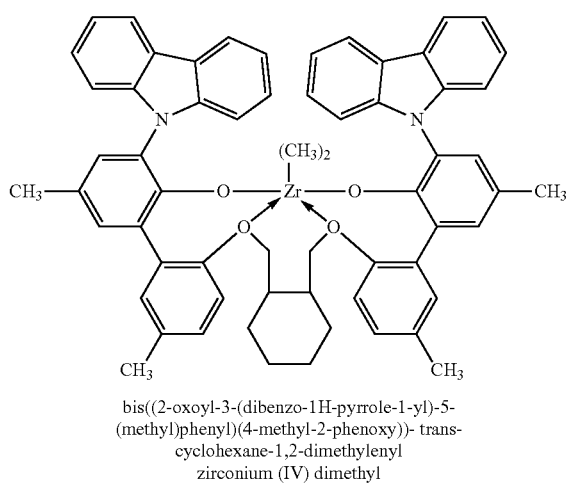

bis((2-oxoyl-3-(dibenzo-1H-pyrrole-1-yl)-5-(methyl)phenyl)(4-methyl-2-phenoxy))- trans-cyclohexane-1,2-dimethylenyl zirconium (IV) dimethyl

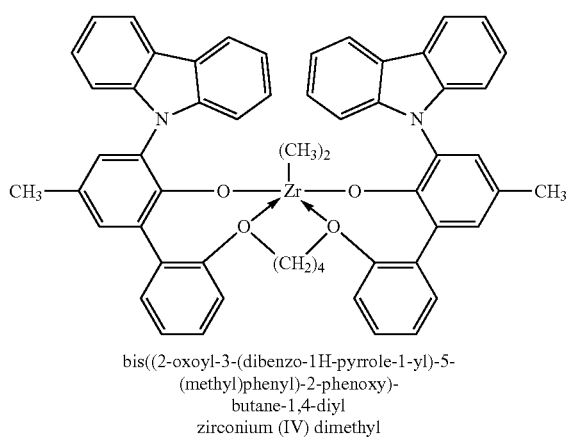

bis((2-oxoyl-3-(dibenzo-1H-pyrrole-1-yl)-5-(methyl)phenyl)-2-phenoxy)-butane-1,4-diyl zirconium (IV) dimethyl -continued

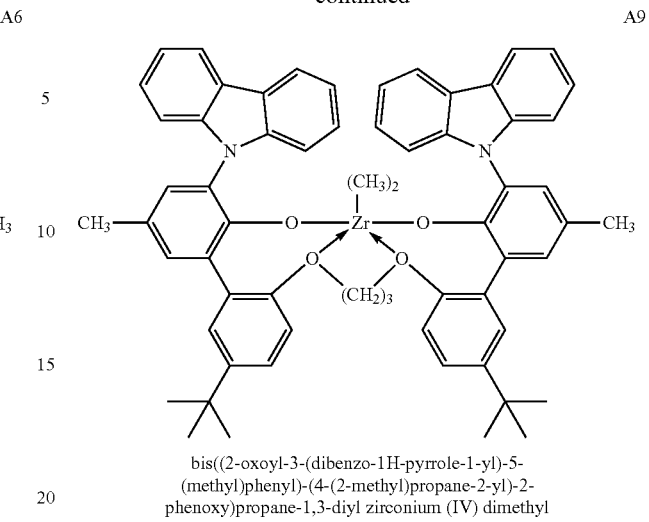

bis((2-oxoyl-3-(dibenzo-1H-pyrrole-1-yl)-5-(methyl)phenyl)-(4-(2-methyl)propane-2-yl)-2-phenoxy)propane-1,3-diyl zirconium (IV) dimethyl bis((2-oxoyl-3-(3,5-bis-(1,1-dimethylethyl)phenyl)-(5-methyl)phenyl)-(4-(1,1-dimethylethyl)-2-phenoxy)-propane-1,3-diyl zirconium (IV) dimethyl Polymerization—Batch Reactor A stirred, one gallon (3.79 L) autoclave reactor is charged with about two liters of mixed alkanes solvent (Isopar™ E) and varying amounts of 1-octene. The reactor is heated to the desired temperature and charged with hydrogen in the indicated quantity followed by sufficient ethylene to bring the total pressure to 450 psig (3.1 MPa). The catalyst composition is prepared in a drybox under inert atmosphere by combining together catalyst, cocatalyst (a mixture of 1.2 equivalents of bis-hydrogenated tallowalkyl)methylammonium tetrakis (pentafluorophenyl)borate and 10 equivalents of triisobutylaluminum modified methalumoxane containing a molar ratio of i-butyl/methyl groups of about 1/3 (MMAO) with additional solvent to give a total volume of about 17 mL. The activated catalyst mixture is injected into the reactor over approximately 4 minutes.

The reactor temperature and pressure are maintained constant by continually feeding ethylene during the polymerization and cooling the reactor as required. After 10 minutes the ethylene is shut off and the hot solution transferred into a nitrogen purged resin kettle. An additive solution containing a phosphorus stabilizer and phenolic antioxidant (Irgaphos 168 and Irganox 1010 in toluene in a 2:1 weight ratio) is added to provide a total additive concentration of about 0.1 percent in the polymer. The polymer is recovered by thorough drying in a vacuum oven. After drying the samples are weighed to determine catalyst efficiency. Between polymerizations the reactor is thoroughly rinsed with hot mixed hexanes. Results are contained in Table 1.

TABLE 1

| Run | Catalyst (μmole) | Solvent (g) | 1-octene (g) | $H_2$ (μmol) | T (°C.) | Efficiency gPE/μgZr | Density (g/cm$^3$) | Mw | Tm (°C.) |
|---|---|---|---|---|---|---|---|---|---|
| 1 | A1 (0.5) | 1350 | 252 | 22 | 145 | 3.2 | nm | 203,000 | 103.7 |
| 2 | A1 (1.5) | 1321 | 252 | 21 | 190 | 1.6 | 0.903 | 103,000 | 96.8 |
| 3 | A1 (1.0) | 1101 | 500 | 6 | 190 | 1.5 | 0.888 | 109,000 | 78.5 |
| 4 | A2 (1.5) | 1447 | 250 | 20 | 190 | 2.0 | 0.883 | 157,000 | 83.1 |
| 5 | A2 (0.8) | 1446 | 127 | 0 | 190 | 2.0 | 0.904 | 269,000 | 101.7 |
| 6 | A2 (1.0) | 1102 | 503 | 0 | 190 | 3.4 | 0.864 | 199,000 | 61.1 |
| 7 | A2 (1.0) | 1448 | 127 | 0 | 200 | 1.6 | 0.894 | 211,000 | 93.6 |
| 8 | A3 (1.5) | 1447 | 250 | 20 | 190 | 1.7 | 0.895 | 160,000 | 90.4 | nm = not measured

Polymerization—Continuous Solution Reactor

Continuous solution polymerizations are carried out in a computer controlled autoclave reactor equipped with an internal stirrer. Purified mixed alkanes solvent (Isopar™ E available from ExxonMobil, Inc.), ethylene, 1-octene, and hydrogen are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Tables 2 and 3.

TABLE 2

| Run | Catalyst[1] | MI | Density (g/cc) | Solvent (kg/h) | $C_2$ Flow (kg/h) | $C_8$ Flow (kg/h) | $H_2$ Flow[2] (sccm) | Conv.[3] (%) | Temp (°C.) | Eff.[4] |
|---|---|---|---|---|---|---|---|---|---|---|
| 9 | A1 | 0.91 | 0.910 | 12.7 | 1.68 | 0.91 | 52.1 | 91.6 | 200 | 1.1 |
| 10 | A1 | 0.97 | 0.870 | 11.7 | 1.25 | 2.72 | 7.2 | 91.5 | 180 | 1.4 |
| 11 | A2 | 0.94 | 0.911 | 13.3 | 1.68 | 0.52 | 46.5 | 93.5 | 190 | 7.6 |
| 12 | A2 | 1.00 | 0.908 | " | " | 0.68 | 36.9 | 91.7 | 201 | 2.6 |
| 13 | A2 | 0.42 | 0.868 | 12.7 | 1.25 | 1.84 | 3.0 | 91.2 | 179 | 2.1 |
| 14 | A2 | 0.86 | 0.869 | " | " | 1.80 | 3.2 | 91.1 | 183 | 1.5 |
| 15 | A2 | 0.86 | 0.934 | " | 1.91 | 0.11 | 109.9 | 92.5 | 200 | 3.2 |
| 16 | A2 | 37.20 | 0.904 | " | 1.59 | 0.91 | 74.9 | 91.6 | 200 | 1.4 |
| 17 | A4 | 0.88 | 0.917 | 12.6 | 1.68 | 0.59 | 35.4 | 91.4 | 190 | 0.9 |
| 18 | A4 | 0.95 | 0.917 | " | " | " | 73.5 | 91.4 | 160 | 1.2 |
| 19 | A5 | 1.05 | 0.909 | 12.7 | " | 0.50 | 38.0 | 90.6 | 160 | 1.8 |
| 20 | A6 | 1.09 | 0.908 | " | " | 0.59 | 40.8 | 90.4 | 160 | 2.1 |
| 21 | A6 | 1.03 | 0.909 | " | " | " | 6.1 | 88.4 | 188 | 0.8 |
| 22 | A10 | 1.14 | 0.907 | 13.0 | " | 0.77 | 52 | 91.7 | 190 | 1.4 |

[1]catalyst was co-fed with 1.2 equivalents of a borate activator: bis-hydrogenated tallowalkyl)methylammonium tetrakis (pentafluorophenyl)borate along with 5 equivalents of triisobutylaluminum-modified alumoxane (MMAO)

[2]standard cm$^3$/min

[3]mol percent ethylene conversion in reactor (measured on reactor effluent)

[4]efficiency, g PE/μg Zr

The runs in Table 3 represent polymerizations which were carried out using low levels of alumoxane as the sole activating cocatalyst at high temperatures.

TABLE 3

| Run | Catalyst[1] | Al Ratio | MI | Density (g/cc) | Solvent Flow (kg/h) | C$_2$ Flow (kg/h) | C$_8$ Flow (kg/h) | H$_2$ Flow[2] (sccm) | Vent[3] Conv. (%) | Temp (° C.) | Eff.[4] |
|---|---|---|---|---|---|---|---|---|---|---|---|
| 24 | A2 | 97.8 | 0.96 | 0.919 | 12.3 | 1.81 | 0.36 | 93.5 | 92.1 | 190 | 3.1 |
| 25 | A7 | 50.2 | 0.98 | 0.910 | 12.6 | 1.68 | 0.59 | 53.0 | 91.7 | 190 | 2.2 |
| 26 | A7 | 50.4 | 1.00 | 0.909 | " | " | " | 62.2 | 90.5 | 160 | 4.0 |
| 27 | A8 | 50.4 | 0.86 | 0.910 | " | " | " | 34.6 | 89.7 | 190 | 0.6 |
| 28 | A8 | 50.3 | 1.59 | 0.911 | " | " | " | 74.3 | 90.3 | 160 | 1.0 |
| 29 | A9 | 50.4 | 0.87 | 0.911 | " | " | " | 24.9 | 92.5 | 190 | 1.8 |
| 30 | A9 | 49.2 | 1.06 | 0.910 | " | " | " | 46.7 | 89.9 | 160 | 5.5 |

[1]catalyst was co-fed with triisobutylaluminum-modified alumoxane (MMAO)
[2]standard cm$^3$/min
[3]percent ethylene conversion in reactor
[4]efficiency, g PE/µg Zr

The invention claimed is:

1. A process for polymerization of ethylene and optionally one or more α-olefins under continuous, solution polymerization conditions to prepare a polymer, said process comprising conducting the polymerization in the presence of a catalyst composition comprising a transition metal complex and an activating cocatalyst under conditions that result in a value for the polymerization index, Ψ, that is greater than or equal to zero as determined by the following equation:

$$\Psi = \beta_0 + \beta_1 T + \beta_2 X + \beta_3 E + \beta_4 \rho + \beta_5 I_2,$$

where, T is the polymerization temperature in degrees Celsius, X is the ethylene conversion in the reactor in mol percent, E is the catalyst efficiency in g polymer produced per µg of metal in the metal complex fed to the reactor per unit time, ρ is the resulting polymer density in units of g/ml, I$_2$ is the melt index of the polymer in units of dg/minute, and the equation constants, $\beta_0$-$\beta_5$, are unitless numbers having the values defined in the following table:

| Equation Constant | Value |
|---|---|
| $\beta_0$ | −13796.073 |
| $\beta_1$ | 111.445393 |
| $\beta_2$ | 137.437524 |
| $\beta_3$ | 62.5876298 |
| $\beta_4$ | −18931.8878 |
| $\beta_5$ | −108.320017 | wherein the catalyst composition additionally comprises a chain transfer agent wherein the quantity of chain transfer agent present in the reactor is sufficient to decrease the Mw of the resulting polymer at least 30 percent compared to the molecular weight of the resulting polymer prepared in the absence of a chain transfer agent.

2. The process of claim 1 wherein the resulting polymer has a molecular weight distribution, Mw/Mn, less than 3.0.

3. The process of claim 1 wherein the chain transfer agent is hydrogen, present in an amount from 0.015 to 2.0 mol percent (based on ethylene).

4. The process of claim 1 wherein the ethylene conversion is at least 85 mol percent.

5. The process of claim 1 wherein ethylene and one or more C$_{3-20}$ α-olefins are copolymerized.

6. The process of claim 5 wherein ethylene and one or more C$_{6-20}$ α-olefins are copolymerized.

7. The process of claim 1 conducted at a temperature from 170 to 250° C. in the presence of a chain transfer agent to prepare a polymer having a density between 0.885 and 0.950 g/cm$^3$, a melt index, I$_2$, <2.0, a molecular weight distribution Mw/Mn<3.0, and a catalyst efficiency of greater than 0.5 g$_{polymer}$/µg$_{metal}$.

8. The process of claim 7 conducted at a temperature from 185 to 250 ° C.

9. The process of claim 1 conducted at a temperature from 130 to 250 ° C. and an ethylene conversion of at least 80 mol percent, in the presence of a chain transfer agent to prepare a polymer having a density between 0.865 and 0.950 g/cm$^3$, a melt index, I$_2$, from 0.01 to 100, a molecular weight distribution Mw/Mn<3.0, and a catalyst efficiency of greater than 0.5 g$_{polymer}$/µg$_{metal}$, and wherein the activating cocatalyst is oligomeric or polymeric alumoxane or modified alumoxane present in an amount to provide a molar ratio, Al:metal complex, from 20-200.

10. The process of claim 9 wherein the oligomeric or polymeric alumoxane or modified alumoxane is present in an amount to provide a molar ratio, Al:metal complex, from 30-150.

11. The process of claim 10 wherein the oligomeric or polymeric alumoxane or modified alumoxane is present in an amount to provide a molar ratio, Al:metal complex, from 40-80.

12. The process of claim 9 wherein the oligomeric or polymeric alumoxane or modified alumoxane is selected from the group consisting of methylalumoxane, isobutylalumoxane; and Lewis acid modified alumoxanes.

13. The process of claim 12 wherein the Lewis acid modified alumoxane is trialkyl aluminum-, perhalogenated tri(hydrocarbyl)aluminum-, or perhalogenated tri(hydrocarbyl)boron modified methylalumoxane.

14. The process of claim 13 wherein the Lewis acid modified alumoxane is triisobutyl aluminum- modified methylalumoxane, tri-n-octyl aluminum- modified methylalumoxane, or tris(pentafluorophenyl)boron- modified methylalumoxane.

15. The process of claim 1 conducted in a single reactor and the catalyst composition comprises at least two metal complexes.

16. The process of claim 1 conducted in at least one reactor of two or more reactors connected in series or in parallel.

17. The process of claim 16 wherein the catalyst composition comprises at least two metal complexes or metal compounds.

18. The process of claim 1 wherein the metal complex corresponds to the formula:

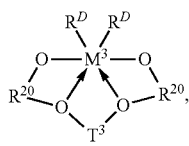

where:
R$^{20}$ is an aliphatic, aromatic or inertly substituted aromatic group containing from 5 to 20 atoms not counting hydrogen, or a polyvalent derivative thereof;
T$^3$ is a hydrocarbylene or silane group having from 1 to 20 atoms not counting hydrogen, or an inertly substituted derivative thereof;
M$^3$ is a Group 4 metal;
R$^D$ independently each occurrence is a monovalent ligand group or two R$^D$ groups together are a divalent hydrocarbylene or hydrocarbadiyl group; and
bonds and electron donative interactions are represented by lines and arrows respectively.

19. The process of claim 18 wherein the metal complex correspond to the formula:

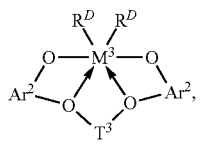

wherein:
T$^3$ is a divalent bridging group of from 2 to 20 atoms not counting hydrogen;
Ar$^2$ independently each occurrence is an arylene or an alkyl-, aryl-, alkoxy- or amino-substituted arylene group of from 6 to 20 atoms not counting hydrogen and not counting the substituents;
M$^3$ is a Group 4 metal;
R$^D$ independently each occurrence is a monovalent ligand group or two R$^D$ groups together are a divalent hydrocarbylene or hydrocarbadiyl group; and
electron donative interactions are represented by arrows.

20. The process of claim 19 wherein the metal complex corresponds to the formula:

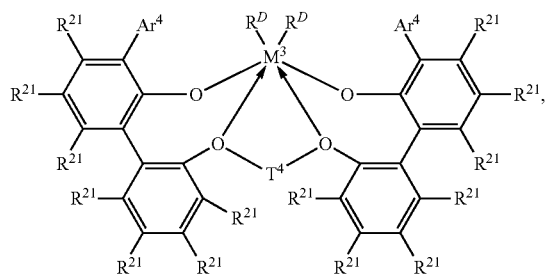

where M$^3$ is Hf or Zr;
Ar$^4$ is C$_{6-20}$ aryl or inertly substituted derivatives thereof;
T$^4$ independently each occurrence comprises a C$_{3-6}$ alkylene group, a C$_{3-6}$ cycloalkylene group, or an inertly substituted derivative thereof;
R$^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and
R$^D$, independently each occurrence is halo or a hydrocarbyl or trihydrocarbylsilyl group of up to 20 atoms not counting hydrogen, or 2 R$^D$ groups together are a divalent hydrocarbylene, hydrocarbadiyl or trihydrocarbylsilyl groups.

21. The process of claim 20 wherein M$^3$ is Zr.

* * * * *